United States Patent
Ham et al.

(10) Patent No.: US 10,741,840 B2
(45) Date of Patent: Aug. 11, 2020

(54) CATHODE ACTIVE MATERIAL PRECURSOR, CATHODE ACTIVE MATERIAL FORMED THEREFROM, METHOD OF PREPARING THE CATHODE ACTIVE MATERIAL, AND CATHODE AND LITHIUM BATTERY EACH INCLUDING THE CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Dongjin Ham, Anyang-si (KR); Jayhyok Song, Suwon-si (KR); Andrei Kapylou, Suwon-si (KR); Jinhwan Park, Seoul (KR); Youhwan Son, Seongnam-si (KR); San Moon, Hwaseong-si (KR); Sungjin Ahn, Anyang-si (KR); Donghee Yeon, Seoul (KR); Jinsu Ha, Yongin-si (KR); Kwangjin Park, Seongnam-si (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/119,170

(22) Filed: Aug. 31, 2018

(65) Prior Publication Data

US 2019/0074513 A1     Mar. 7, 2019

(30) Foreign Application Priority Data

Sep. 4, 2017 (KR) .................. 10-2017-0112565
Aug. 20, 2018 (KR) .................. 10-2018-0096821

(51) Int. Cl.
*H01M 4/13* (2010.01)
*H01M 4/525* (2010.01)
(Continued)

(52) U.S. Cl.
CPC ........... *H01M 4/525* (2013.01); *H01M 4/131* (2013.01); *H01M 4/364* (2013.01); *H01M 4/505* (2013.01);
(Continued)

(58) Field of Classification Search
CPC ...... H01M 4/525; H01M 4/131; H01M 4/364; H01M 4/505; H01M 10/052;
(Continued)

(56) References Cited

U.S. PATENT DOCUMENTS 6,773,852 B2   8/2004  Cho et al.
8,859,148 B2 * 10/2014  Park .................. H01M 4/505
                                                    252/182.1
(Continued)

FOREIGN PATENT DOCUMENTS

JP    1998029820 A   2/1998
KR    1019990034748 A   5/1999
(Continued)

*Primary Examiner* — Raymond Alejandro
(74) *Attorney, Agent, or Firm* — Cantor Colburn LLP

(57) ABSTRACT

A cathode active material includes a secondary particle including an aggregate of a plurality of primary particles, wherein the secondary particle includes a nickel-containing lithium transition metal oxide having a layered crystal structure, wherein the plurality of primary particles includes a first primary particle having a size greater than about 400 nanometers, a second primary particle having a size less than about 150 nanometers, and a third primary particle having a size of about 150 nanometers to about 400 nanometers, wherein the third primary particle has a area of greater than or equal to about 80% of a total area of the plurality of primary particles, and wherein the secondary particle has a porosity of less than or equal to about 10% of a total area of the cathode active material.

18 Claims, 19 Drawing Sheets

(51) Int. Cl.
*H01M 10/052* (2010.01)
*H01M 4/131* (2010.01)
*H01M 4/36* (2006.01)
*H01M 4/505* (2010.01)
*H01M 10/0525* (2010.01)
*H01M 4/02* (2006.01)

(52) U.S. Cl.
CPC ..... *H01M 10/052* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028
See application file for complete search history.

(56) References Cited

U.S. PATENT DOCUMENTS

| | | | |
|---|---|---|---|
| 9,553,310 B2* | 1/2017 | Nagai | H01M 4/131 |
| 9,871,246 B2* | 1/2018 | Kim | H01M 4/136 |
| 9,954,226 B2 | 4/2018 | Zhu et al. | |
| 10,128,501 B2 | 11/2018 | Fukui et al. | |
| 2016/0133927 A1 | 5/2016 | Kamata et al. | |
| 2016/0181597 A1 | 6/2016 | Kim et al. | |
| 2018/0254511 A1 | 9/2018 | Park et al. | |

FOREIGN PATENT DOCUMENTS

| | | |
|---|---|---|
| KR | 1020010002211 A | 1/2001 |
| KR | 101568263 B1 | 11/2015 |
| KR | 101696524 B1 | 1/2017 |
| KR | 1020170016959 A | 2/2017 |
| KR | 1020170063397 A | 6/2017 |

\* cited by examiner

CATHODE ACTIVE MATERIAL PRECURSOR, CATHODE ACTIVE MATERIAL FORMED THEREFROM, METHOD OF PREPARING THE CATHODE ACTIVE MATERIAL, AND CATHODE AND LITHIUM BATTERY EACH INCLUDING THE CATHODE ACTIVE MATERIAL

CROSS-REFERENCE TO RELATED APPLICATION

This application claims priority to and the benefit of Korean Patent Application Nos. 10-2017-0112565 and 10-2018-0096821, filed in the Korean Intellectual Property Office on Sep. 4, 2017 and Aug. 20, 2018, respectively, the entire contents of which are incorporated herein by reference.

BACKGROUND

1. Field

The present disclosure relates to a cathode active material precursor, a cathode active material obtained therefrom, a method of preparing the cathode active material, and a cathode and a lithium battery each including the cathode active material.

2. Description of the Related Art

To comply with trends towards smaller-size, higher-performance devices, the manufacture of lithium batteries having an improved energy density, e.g., smaller size and lighter weight, has become increasingly important. To implement a lithium battery satisfying these requirements, a nickel-based cathode active material having a high capacity is being considered.

However, a currently available nickel-based cathode active material may lead to poor lifetime characteristics and unsatisfactory thermal stability due to side reactions caused by a large content of residual surface lithium and cation mixing. Thus there remains a need for an improved cathode active material.

SUMMARY

Provided are a cathode active material precursor having a large specific area and a large average particle diameter, a cathode active material having a uniform particle size distribution and prepared from the cathode active material precursor, and a method of preparing the cathode active material.

Provided is a cathode including the cathode active material.

Provided is a lithium battery having an improved initial efficiency due to inclusion of the cathode.

Provided is the cathode active material precursor.

Additional aspects will be set forth in part in the description which follows and, in part, will be apparent from the description, or may be learned by practice of the presented embodiments.

According to an aspect of an embodiment, a cathode active material includes: a secondary particle including a plurality of primary particles, wherein the secondary particle includes a nickel-containing lithium transition metal oxide having a layered crystal structure, wherein the plurality of primary particles includes a first primary particle having a size greater than about 400 nanometers (nm), a second primary particle having a size less than about 150 nanometers, and a third primary particle having a size of about 150 nanometers to about 400 nanometers, wherein the third primary particle has an area of greater than or equal to about 80% of a total area of the plurality of primary particles, and wherein the secondary particle has a porosity of less than or equal to about 10% of a total area of the cathode active material.

According to an aspect of another embodiment, a cathode includes the cathode active material.

According to an aspect of an embodiment, a lithium battery includes the cathode, an anode, and an electrolyte disposed between the cathode and the anode.

According to an aspect of an embodiment, a cathode active material precursor includes a vertical plate network-structured precursor of a nickel-containing lithium transition metal oxide, wherein the cathode active material precursor has a specific area of about 8 square meters per gram ($m^2/g$) to about 25 square meters per gram, and an average particle diameter (D50) of about 13.7 micrometers ($\mu m$) or greater.

According to an aspect of an embodiment, a method of preparing the cathode active material includes: mixing the cathode active material precursor and a lithium precursor to produce a mixture, wherein the cathode active material precursor has a specific area of about 8 square meters per gram to about 25 square meters per gram, and an average particle diameter of about 13.7 micrometers or greater, and wherein the cathode active material precursor is a vertical plate network-structured precursor of a nickel-containing lithium transition metal oxide; first thermally treating the mixture to produce a first product; washing the first product with water to produce a washed product; drying the washed product to produce a dried product; and second thermally treating the dried product to prepare the cathode active material, wherein a temperature of the second thermally treating is less than a temperature of the first thermally treating.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
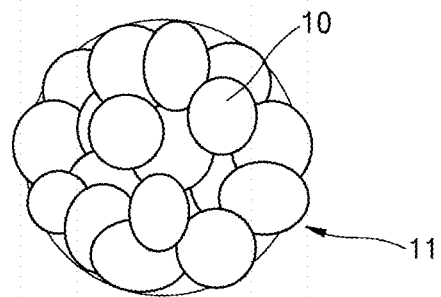
FIG. 1A is a schematic illustration of an embodiment of a secondary particle of a cathode active material comprising primary particles and prepared from a cathode active material precursor.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, example embodiments of a cathode active material precursor, a cathode active material obtained therefrom, a method of preparing the cathode active material, and a cathode and a lithium battery each including the cathode active material will now be described in greater detail.

According to an aspect, a cathode active material comprises a secondary particle including an aggregate of a plurality of primary particles, wherein the secondary particle comprises a nickel-containing, i.e., a nickel-based, lithium transition metal oxide having a layered crystal structure, wherein the plurality of primary particles comprises a first primary particle having a size greater than about 400 nanometers (nm), a second primary particle having a size less than about 150 nm, and a third primary particle having a size of about 150 nm to about 400 nm, wherein the third primary particles has an area of greater than or equal to about 80% of a total area of the plurality of primary particles, and wherein the secondary particle has a porosity of less than or equal to about 10% of a total volume of the cathode active material. The area may be determined according to scanning electron microscopy (SEM) and the porosity may be determined using nitrogen isotherms according to the method of Barrett, Joyner, and Halenda (i.e., a BJH surface area).

In some embodiments, the first primary particle may have an area of less than or equal to about 20%, about 1% about to 20%, or about 2% to about 18% of the total area of the plurality of primary particles, an area of the second primary particle may be less than or equal to about 9%, about 0.5% to about 9%, or about 1% to about 7% of the total area of the plurality of primary particles, and the secondary particle may have a porosity of about 1% to about 10%, about 2% to about 8%, or about 3% to about 6% of the total volume of the cathode active material.

In some embodiments, the plurality of primary particles may have a particle uniformity of greater than or equal to about 90%, e.g., about 90% to about 99%, or about 91% to about 98%, and the first primary particle may have an area of about 2.1% to about 19.2%, for example, about 2.1% to about 15%, of the area of the plurality of primary particles. The second primary particle may have an area of about 0.1% to about 8.6%, and in some embodiments, about 0.1% to about 5%, and in some other embodiments, about 0.1% to about 3%, and in still other embodiments, about 0.1% to about 1.5%, of the total area of the plurality of primary particles.

The particle size of each particle was measured using SEM, and then the particle size distribution of each particle was measured to determine the particle uniformity.

In some embodiments, the secondary particle may have a porosity of about 1.5% to about 7%, or about 2% to about 6%, of the total area of the cathode active material.

In some embodiments, the cathode active material may be obtained from a cathode active material precursor having a large specific area and a large average particle diameter, and have a uniform particle size distribution, for example, of primary particles.

To implement a high-capacity nickel-based cathode in practice, there is a need to overcome irreversible intercalation and deintercalation of lithium, i.e., the inability of lithium ions released to be absorbed again, during an initial charging process, and to provide improved electrode plate density, e.g., by using an active material including large and small sized particles in combination. However, a high-capacity nickel-containing cathode may have irreversible capacity loss, and may have a further reduced specific capacity when formed using a large-particle size active material having a large particle diameter.

A nickel-containing cathode active material having a nickel content of greater than or equal to about 80 mole % may have an initial efficiency as low as about 80% to about 85%, which is desirably improved to provide a satisfactory cathode active material. During an initial cycle, due to a ratio of discharge capacity to charge capacity as low as about 80% to about 85%, lithium ions absorbed by an anode during charging may not be entirely absorbed back into a cathode during discharging. Accordingly, a lithium battery including such a cathode active material may have a reduced capacity. To improve the initial efficiency of a lithium battery and overcome these drawbacks, a cathode active material including a primary particle having a small particle size and improved particle size uniformity may be used.

In the disclosed cathode active material according to an embodiment, when the cathode active material includes the first primary particle having a size greater than about 400 nm and the second primary particle having a size less than about 150 nm, a lithium battery having improved initial efficiency and capacity due to an increased electrode plate density may be manufactured. Further improvement is provided when a third primary particle having a size of about 150 nanometers to about 400 nanometers is used, and further improvement is provided when the third primary particle has an area of greater than or equal to about 80% of a total area of the plurality of primary particles, and wherein the secondary particle has a porosity of less than or equal to about 10% of a total volume of the cathode active material. Additional improvement is provided when a particle uniformity of greater than or equal to about 90% is used. Thus, a lithium battery having improved initial efficiency, improved capacity, and improved electrode plate density, resulting in further improvement in capacity, may be manufactured.

Figure 1B:
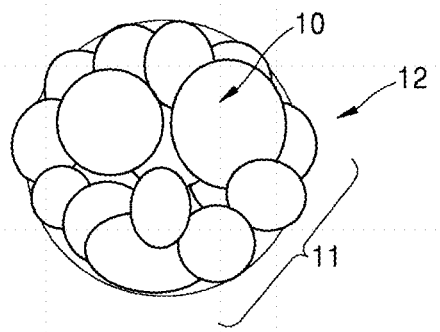
FIG. 1B is a schematic illustration of a secondary particle of a cathode active material comprising primary particles and prepared from an alternative cathode active material precursor.

FIG. 1A illustrates a primary particle 10 and a secondary particle 11 in a cathode active material according to an embodiment. FIG. 1B illustrates primary particles 10 and a secondary particle 12 in a cathode active material prepared using a plate-shaped cathode active material precursor, for comparison with the cathode active material of FIG. 1A. The particles of the secondary particle 12 of FIG. 1B are on average larger and less uniform in size than those in the cathode active material of FIG. 1A.

Referring to FIG. 1B, the cathode active material including the primary particles 10 having a large and/or non-uniform particle size may be obtained by mixing a plate-shaped cathode active material precursor having a small specific area with a lithium precursor and then thermally treating a resulting mixture.

On the contrary, referring to FIG. 1A, the cathode active material according to an embodiment, including the primary particles 10 of a small size and having improved particle uniformity, and not including large particles, may be obtained by mixing a cathode active material precursor with a lithium precursor and thermally treating a resulting mixture. The cathode active material precursor may have improved reactivity due to having a specific area is about 8 $m^2/g$ to about 25 $m^2/g$ and an average particle diameter greater than or equal to about 13.7 µm, for example, greater than or equal to about 15 µm.

In some embodiments, the cathode active material precursor may have a specific area of about 10 square meters per gram ($m^2/g$) to about 20 $m^2/g$, for example, about 11.76 $m^2/g$ to about 19.92 $m^2/g$. In some embodiments, the cathode active material precursor may have an average particle diameter of greater than or equal to about 13.7 µm, and in some other embodiments, greater than or equal to about 15 µm, and in still other embodiments, greater than or equal to about 17 µm, and in yet still other embodiments, about 15 µm to about 19.7 µm.

In some embodiments, the cathode active material precursor may have a shape of a vertical plate network structure.

As used herein, the term "vertical plate network structure" refers to a structure in which plate particles are grown towards a surface of the precursor, so that a network structure of crossing particles is observed on the surface of the precursor. In particular, it may mean that a thickness of the plate particles is smaller than a major-axis length thereof, and in other words, a structure having a length of plate particles in an axial direction (i.e., thickness direction) is smaller than a major-axis length in another direction. The major-axis length may refer to a maximum length based on the largest surface of a plate particle.

In some embodiments, the cathode active material precursor may have a major-axis length of about 150 nanometers (nm) to about 2,000 nm, for example, about 150 nm to about 1,500 nm, and a minor-axis length of about 10 nm to about 100 nm, for example, about 10 nm to about 50 nm. The shape, the major-axis length, and the minor-axis length of the cathode active material precursor may be identified using scanning electron microscopy (SEM). An aspect ratio of the cathode active material precursor may be about 5 to about 500, about 10 to about 250, or about 20 to about 100, wherein the aspect ratio is a major-axis length divided by a minor-axis length.

Figure 2A:
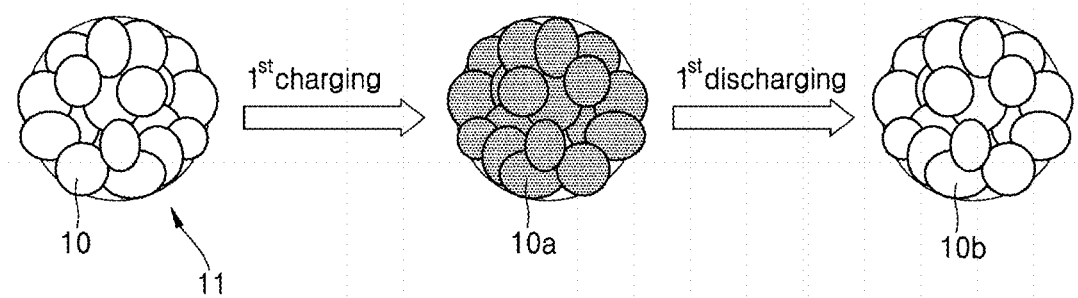
FIG. 2A illustrates states of primary particles of a cathode active material according to an embodiment before and after a first cycle of charging and discharging.
Figure 2B:
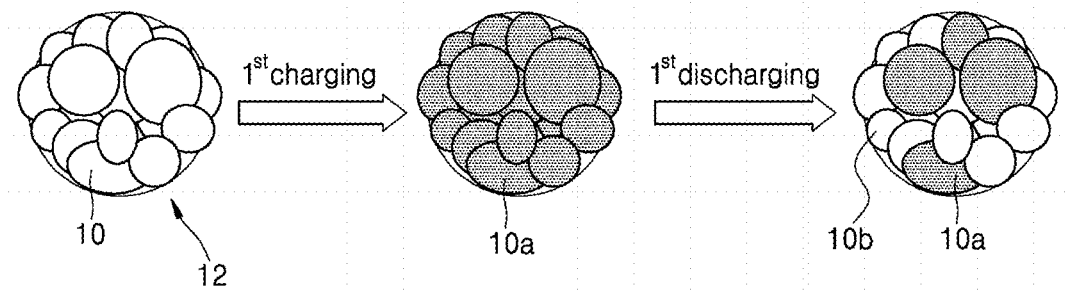
FIG. 2B illustrates states of primary particles of a cathode active material according to an embodiment, before and after a first cycle of charging and discharging.

In some embodiments, the secondary particle of the cathode active material may have a porosity of less than or equal to about 10% of a total volume of the cathode active material. For example, the secondary particle may have a porosity of about 1% to about 10%, and in some embodiments, about 1.5% to about 7%, and in some other embodiments, about 1.8% to about 2.5%, of a total area of the cathode active material. When the secondary particle of the cathode active material has a porosity within these ranges, sufficient intercalation of lithium ions is provided during discharge, such that a lithium battery having improved initial efficiency may be manufactured using the cathode active material. However, when using the cathode active material of FIG. 1B comprising the secondary particle 12, including large and/or non-uniform primary particles as illustrated in FIG. 2B, an initial efficiency may be reduced since lithium ions may not be sufficiently accepted during the first discharging, while charge capacity during the first charge may be similar to that when using the cathode active material of FIG. 1A. For example, as shown in FIG. 2A, charged primary particles 10a are converted to discharged particles 10b after the first discharging. In contrast, as shown in FIG. 2B, only some of the charged primary particles 10a are converted to discharged particles 10b after the first discharging.

The cathode active material of FIG. 1A does not include large and/or non-uniform primary particles, relative to the cathode active material of FIG. 1B. Accordingly, using the cathode active material of FIG. 1A, which may ensure sufficient intercalation of lithium ions during discharge as illustrated in FIG. 2A, a lithium battery having an improved efficiency may be manufactured. For example, the lithium battery according to one or more embodiments may have an initial efficiency of about 93% or greater, and in some embodiments, about 95% or greater, and in some other embodiments, about 95% to about 99%.

The cathode active material according to one or more embodiments may include a reduced content of surface residual lithium, so that deterioration of the cathode active material may be suppressed, and gas generation may be reduced, thus improving thermal stability of the lithium battery. The lithium battery may accommodate volume changes of the primary particles that occur due to charging and discharging. The lithium battery may also suppress cracking or fracture of the primary particles and suppress a reduction in mechanical strength of the positive active material even after charging and discharging for a long period. The cathode active material according to one or more embodiments may efficiently suppress a side reaction of the nickel-based lithium transition metal oxide having a layered crystal structure with an electrolyte. The cathode active material may also reduce an internal resistance of the lithium battery, thus improving cycle characteristics of the lithium battery.

In the cathode active material according to one or more embodiments, the nickel-based lithium transition metal oxide having a layered crystal structure may have a layered rock-salt structure and may belong to space group R-3m.

Due to the crystal structure of the nickel-based lithium transition metal oxide, a lithium battery including the cathode active material may have further improved cycle characteristics and thermal stability.

The term "grain boundary" may refer to an interface between two adjacent primary particles, wherein the interface between the two primary particles may be inside a secondary particle.

The term "primary particle" may refer to a particle which may form a secondary particle by aggregation, wherein the primary particle may have any of a variety of shapes, including a rod shape and a rectangular shape, or a combination thereof. The term "secondary particle" may refer to a particle which does not aggregate any further with other particles, and may have spherical characteristics.

As used herein, the term "size" may refer to an average particle diameter when particles are spherical, and the term "size" may refer to a major-axis length when particles are non-spherical. Particle size may be determined by SEM, for example.

In some embodiments, in the nickel-based lithium transition metal oxide of the cathode active material, a nickel content in the transition metal may be about 80 mole percent (mol %) or greater, and in some embodiments, about 90 mol % or greater, and in some other embodiments, about 95 mol % or greater. Using the nickel-based lithium transition metal oxide having a nickel content within these ranges, a lithium battery having increased capacity may be manufactured.

In some embodiments, the nickel-based lithium transition metal oxide having a layered crystal structure may be a compound represented by Formulas 1 to 4.

   Formula 1

In Formula 1, $1 \le x \le 1.1$, $0 \le y \le 0.2$, $0 \le z \le 0.2$, $0 \le \alpha \le 0.05$, and Me may be Zr, Al, Mg, Ti, Cu, W, B, or a combination thereof, and $y+z+\alpha \le 0.3$,

   Formula 2

   Formula 3

   Formula 4

In Formulae 2 to 4, $1 \le x \le 1.1$, $0 \le y \le 0.9$, $0 \le z \le 0.2$, $0 \le \alpha \le 2$, M may be Ni, Mn, Zr, Al, Mg, Ag, Mo, Ti, V, Cr, Fe, Cu, B, or a combination thereof, Me may be Co, Zr, Al, Mg, Ag, Mo, Ti, V, Cr, Mn, Fe, Cu, B, or a combination thereof, Ma may be Co, Zr, Al, Mg, Ag, Mo, Ti, V, Cr, Fe, Cu, B, or a combination thereof, and X may be F, S, P or a combination thereof.

In Formulae 2 to 4, x, y, a, and Me may each be independently selected.

For example, in Formulae 2 to 4, each x may independently be about 1.00 to about 1.09, and in some embodiments, about 1.03 to about 1.09, and in some other embodiments, about 1.03, 1.06, or 1.09.

In some embodiments, the nickel-containing lithium transition metal oxide having a layered crystal structure may be a compound represented by Formulas 5 to 7.

   Formula 5

In Formula 5, $0.8 \le a < 1$, $0 \le d \le 0.1$, and

Me may be Ni, Co, Mn, Al, V, Cr, Fe, Zr, Re, B, Ge, Ru, Sn, Ti, Nb, Mo, Pt or a combination thereof.

   Formula 6

In Formula 6, $0.8 \le x \le y \le z < 1$, $0 < x < 1$, $0 < y < 1$, $0 < z < 1$, $0 \le d \le 0.1$, and Ma, Mb, and Mc may each independently be Mn, Co, Ni, Al, or a combination thereof.

$$Li[Li_{1-x-y-z}Ni_xCo_yMn_z]O_{2+d} \quad \text{Formula 7}$$

In Formula 7, $0.8 \le x+y+z<1$; $0<x<1$, $0<y<1$, $0<z<1$, and $0 \le d \le 0.1$.

For example, the nickel-containing lithium transition metal oxide having a layered crystal structure may be a compound represented by Formula 8.

$$aLi_2MnO_{3-}(1-a)LiMO_2 \quad \text{Formula 8}$$

In Formula 8, $0<a<1$, and

M may include nickel (Ni), cobalt (Co), manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt) or a combination thereof.

For example, the nickel-containing lithium transition metal oxide having a layered crystal structure may be a compound represented by Formula 9.

$$Li_xNi_{1-y-z}M_yCo_zO_2 \quad \text{Formula 9}$$

In Formula 9, $0.90 \le x \le 1.1$, $0 \le z \le 0.2$, $0.8 \le 1-y-z \le 0.99$, and M may be manganese (Mn), aluminum (Al), titanium (Ti), calcium (Ca), or a combination thereof.

In Formula 9, 1−y−z may be, for example, about 0.8 to about 0.91.

In Formula 9, each x may independently be about 1.0 to about 1.09, and in some embodiments, about 1.03 to about 1.09, and in some other embodiments, about 1.03, about 1.06, or about 1.09.

For example, the nickel-based lithium transition metal oxide may be $Li_{1.03}[Ni_{0.91}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.05}[Ni_{0.88}Co_{0.08}Mn_{0.04}]O_2$, $Li_{1.05}[Ni_{0.8}Co_{0.15}Mn_{0.05}]O_2$, $Li_{1.05}[Ni_{0.85}Co_{0.10}Mn_{0.05}]O_2$, $Li_{1.05}[Ni_{0.91}Co_{0.05}Mn_{0.04}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.15}Mn_{0.05}]O_2$, $Li_{1.06}[Ni_{0.85}Co_{0.10}Mn_{0.05}]O_2$, $Li_{1.06}[Ni_{0.91}Co_{0.05}Mn_{0.04}]O_2$; $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, or $Li_{1.09}[Ni_{0.91}Co_{0.05}Mn_{0.04}]O_2$.

In some embodiments, the primary particles of the cathode active material may have an average particle diameter of about 0.01 μm to about 1 μm, and in some embodiments, about 0.2 μm to about 0.4 μm. However, embodiments are not limited thereto. The average particle diameter of the primary particles may be controlled within a range in which improved charging and discharging characteristics may be obtained.

In some embodiments, the at least one secondary particle as an aggregate of the primary particles of the cathode active material may have an average particle diameter of about 1 μm to about 30 μm, and in some other embodiments, about 10 μm to about 20 μm, and in still other embodiments, about 13 μm to about 15 μm. However, embodiments are not limited thereto. The average particle diameter of the at least one secondary particle may be controlled within a range in which improved charging and discharging characteristics may be obtained.

In some embodiments, grain boundaries of the cathode active material may have an average grain boundary length of about 50 nm to about 1000 nm and an average grain boundary thickness of about 1 nm to about 200 nm, wherein the grain boundaries may be parallel to surfaces of the primary particles adjacent to one another in a length direction, and perpendicular to surfaces of the primary particles adjacent to one another in a thickness direction. When the cathode active material has an average grain boundary length and an average grain boundary thickness within these ranges, further improved charging and discharging characteristics may be obtained.

According to another aspect, a method of preparing the cathode active material according to any of the above-described embodiments is disclosed. In an embodiment, the method comprises mixing the cathode active material precursor and a lithium precursor to produce a mixture, wherein the cathode active material precursor has a specific area of about 8 square meters per gram to about 25 square meters per gram, and an average particle diameter of about 13.7 micrometers or greater, and wherein the cathode active material precursor is a vertical plate network-structured precursor of a nickel-containing lithium transition metal oxide; first thermally treating the mixture to produce a first product; washing the first product with water to produce a washed product; drying the washed product to produce a dried product; and second thermally treating the dried product to prepare the cathode active material, wherein a temperature of the second thermally treating is less than a temperature of the first thermally treating. The method may comprise: mixing the cathode active material precursor and a lithium precursor to produce a mixture and performing a first thermal treatment on the mixture; washing, with water, a product resulting from the first thermal treatment and drying a washed product resulting from the washing; and performing a second thermal treatment on a dried product resulting from the drying.

To remove residual lithium of the cathode active material obtained according to the above-described method, further washing/coating and thermal treatment may be performed. Using dehydrated LiOH as the lithium precursor may reduce the duration of thermal treatment and increase yield.

The second thermal treatment after the washing may be performed in a temperature range of, for example, about 150° C. to about 800° C., which may be appropriately chosen by one of skill in the art without undue experimentation according to a coating material.

In some embodiments, the cathode active material precursor according to any of the above-described embodiments may be prepared by mixing a metal source for forming the cathode active material precursor, a complexing agent, and a pH-adjusting agent, adjusting a pH of a resulting mixture, and reacting a resulting pH-adjusted mixture.

The first and second thermal treatments may be performed under an oxidizing gas atmosphere, wherein the oxidizing gas atmosphere may be created using oxygen or the air.

For example, the first thermal treatment and the second thermal treatment may be performed at a temperature of about 600° C. to about 900° C., and in some embodiments, about 730° C. to about 760° C., and in some other embodiments, about 740° C. to about 750° C. The second thermal treatment may be performed at a lower temperature than the first thermal treatment.

For example, the first thermal treatment may be performed at a temperature of about 650° C. to about 800° C., and in some embodiments, about 700° C. to about 750° C., and in some other embodiments, about 730° C. to about 750° C., for about 20 hours to about 30 hours. For example, the second thermal temperature may be performed at a temperature of about 650° C. to about 800° C., and in some embodiments, about 700° C. to about 750° C. for about 10 hours to 30 hours.

In some embodiments, the first thermal treatment may be performed at about 730° C. to about 750° C. for about 20 hours to about 30 hours. The second thermal treatment may be performed at a temperature of about 720° C. for about 24 hours.

In some embodiments, the first and second thermal treatments may be performed wherein a heating rate is about 0.5 degrees Celsius per minute (° C./min) to about 10° C./min. For example, the heating rate may be controlled in a range of about 1° C./min to about 10° C./min, for example, to about 2° C./min to reach the above-described thermal treatment temperatures In the washing and drying the product from the first thermal treatment, the drying may be performed at a temperature of about 50° C. to about 150° C. Through the washing with water and drying, residual lithium on the surface of the cathode active material may be efficiently removed.

In the first thermal treatment, the time of the first heat treatment may be varied according to the temperature of the first thermal treatment. The maintenance time of the first heat treatment at the first heat treatment temperature may be controlled in a range of about 2 hours to about 20 hours, for example, about 5 hours to about 15 hours.

The temperature of the second thermal treatment may be lower than the temperature of the first thermal treatment. A cooling rate from the first heat treatment to the second thermal treatment is about 1 degrees Celsius per minute (° C./min) to about 10° C./min. For example, the cooling rate may be controlled in a range of about 0.8° C./min to about 10° C./min, for example, to about 1° C./min to 2.5° C./min. The cathode active material obtained using the above-described method may have a pressed density of greater than or equal to about 2.8 grams per cubic centimeter (g/cc), and in some embodiments, about 2.9 g/cc to about 3.1 g/cc.

In some embodiments, after the drying, coating the cathode active material with a cobalt-containing salt may be performed to obtain a cathode active material having a lithium cobalt oxide coating layer on a surface thereof.

In the method according to one or more embodiments, a hydroxide, a carbonate, an oxalate, or the like, which may be used to prepare the cathode active material according to one or more embodiments, may be used as the cathode active material precursor.

For example, the cathode active material precursor may be obtained by mixing a cobalt precursor, a nickel precursor, and a manganese precursor with a solvent to obtain a metal precursor mixture, performing co-precipitation of the metal precursor mixture to obtain a precipitate, and thermally treating the precipitate, thereby obtaining the target cathode active material precursor.

In some embodiments, the solvent may be water. The metal precursor mixture may be an aqueous metal precursor solution including water as the solvent.

In the co-precipitation of the metal precursor mixture, a chelating agent such as ammonia water may be added, and a pH of the reaction mixture may be adjusted using a pH-adjusting agent such as an aqueous sodium hydroxide solution. In some embodiments, a concentration of the ammonia water may be about 20 weight percent (wt. %) to about 35 wt. %, for example, about 28 wt. %. In some embodiments, a concentration of the sodium hydroxide solution may be about 15 wt. % to about 40 wt. %, and in some other embodiments, about 20 wt. % to about 35 wt. %.

Physical properties such as particle shape, and sizes such as a specific area, average particle diameter, or the like of the cathode active material precursor, may be influenced by the concentrations of the metal precursors, a mixing ratio of a complexing agent such as ammonia water to transition metal, reaction temperature, stirring rate, reaction time, and a pH range.

In some embodiments, the temperature of the co-precipitation may be about 30° C. to about 50° C., for example, about 40° C. to about 45° C. The mixed ratio of the complexing agent to a metal in the metal precursor mixture may be about 1:0.3 to about 1:0.55, for example, about 1:0.45 to about 1:0.5. The metal may refer to a transition metal such as nickel, cobalt, and manganese, which are further added, in addition to lithium, in preparing the cathode active material according to one or more embodiments.

In some embodiments, each concentration of the metal precursors such as a cobalt precursor, a nickel precursor, and a manganese precursor may be about 0.5 moles per liter (M) to about 1.0M, for example, about 0.75M to about 1M. A pH of the reaction mixture may be, for example, about 10 to about 11. A stirring rate of the reaction mixture may be, for example, about 300 revolutions per minute (rpm) to about 500 rpm. The reaction time may be varied depending on the above-described conditions. For example, the reaction time may be about 11 hours to about 30 hours, and in some embodiments, about 11.5 hours to about 26 hours.

In some embodiments, the cobalt precursor, the nickel precursor, and the manganese precursor may be a chloride, a sulfate, or a nitrate of the cobalt, nickel, and manganese.

In some embodiments, the method of preparing the cathode active material precursor may further include washing with water and drying after the thermal treatment.

In some embodiments, the cathode active material may have a pressed density of greater than or equal to about 2.7 g/cc, for example, about 2.7 g/cc to about 3.08 g/cc.

The cathode active material according to one or more embodiments may be used as a large-particle-size cathode active material in preparing a cathode. For example, the cathode active material may be used as a bimodal cathode active material by being mixed with a small-particle-size cathode active material. The bimodal cathode active material as a mixture of a large-particle-size cathode active material and a small-particle-size cathode active material may have a pressed density of greater than or equal to about 3.3 g/cc, and in some embodiments, about 3.5 g/cc to about 4.0 g/cc, and in some other embodiments, about 3.6 g/cc to about 4.00 g/cc, and in still other embodiments, about 3.6 g/cc to about 4.0 g/cc.

The small-particle-size cathode active material may have an average particle diameter of about 2 μm to about 5 μm. The large-particle-size cathode active material may have an average particle diameter of greater than or equal to about 15 μm, for example, about 16 μm to about 25 μm. A mixing ratio by weight of the large-particle-size cathode active material to the small-particle-size cathode active material may be about 1:99 to about 99:1, and in some embodiments, about 1:9 to about 9:1, and in some other embodiments, about 6:4 to about 7:3.

In some embodiments, in a lithium battery including the cathode active material according to one or more embodiments, as a result of X-ray diffraction analysis of the cathode active material after discharging the lithium battery at about 3.5 volts (V), the cathode active material after the discharging may have a reduced a-axis crystal lattice constant by about 0.1% to about 0.5% and an increased c-axis crystal lattice constant by about 0.1% to about 0.5%, relative to before the discharging.

According to another aspect, a cathode includes a cathode active material according to any of the above-described embodiments.

The cathode may be prepared as follows: a cathode active material according to any of the above-described embodiments, a conducting agent, a binder, and a solvent may be mixed together to prepare a cathode active material composition. The cathode active material composition may be directly coated on an aluminum current collector and then dried to form a cathode having a cathode active material layer. In some embodiments, the cathode active material composition may be cast on a separate support to form a cathode active material film. This cathode active material film may then be separated from the support and then laminated on an aluminum current collector to form a cathode having the cathode active material layer.

The conducting agent may be carbon black, graphite particulates, natural graphite, artificial graphite, acetylene black, or Ketjen black; carbon fibers; carbon nanotubes; a metal powder, metal fibers, or metal tubes of copper, nickel, aluminum, or silver; or a conducting polymer such as a polyphenylene derivative, but embodiments are not limited thereto. Any suitable material available as a conducting agent in the art may be used.

Examples of the binder include a vinylidene fluoride/hexafluoropropylene copolymer, polyvinylidene fluoride (PVDF), polyacrylonitrile, polymethyl methacrylate, polytetrafluoroethylene (PTFE), mixtures thereof, and a styrene-butadiene rubber polymer. However, embodiments are not limited thereto. Any suitable material available as a binder in the art may be used. Examples of the solvent are N-methyl-pyrrolidone (NMP), acetone, or water. However, embodiments are not limited thereto. Any suitable material available as a solvent in the art may be used.

The amounts of the cathode active material, the conducting agent, the binder, and the solvent may be the same as amounts generally used in the art for lithium secondary batteries. At least one of the conducting agent, the binder, and the solvent may be omitted according to the use and the structure of the lithium battery.

The cathode may further include a second cathode active material, in addition to the above-described cathode active material according to an embodiment.

The second cathode active material may be any suitable material available as a cathode active material in the art and, for example, may be a lithium-containing metal oxide. For example, the common cathode active material may be a lithium composite oxide with a metal selected from among Co, Mn, Ni, or a combination thereof. In some embodiments, the common cathode active material may be a compound represented by one of the following formulae: $Li_aA_{1-b}B'_bD_2$ (wherein $0.90 \leq a \leq 1$ and $0 \leq b \leq 0.5$); $Li_aE_{1-b}B'_bO_{2-c}D_c$ (wherein $0.90 \leq a \leq 1$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as cathode active materials may have a surface coating film (hereinafter, also referred to as "coating film"). In other embodiments, a mixture of a compound without a coating film and a compound having a coating film, the compounds being selected from the compounds listed above, may be used. In some embodiments, the coating film may include an oxide, a hydroxide, an oxyhydroxide, an oxycarbonate, a hydroxycarbonate, or a combination thereof, of the coating element. In some embodiments, the compounds for the coating film may be amorphous and/or crystal. In some embodiments, the coating element for the coating film may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating film may be formed using any method that does not adversely affect the physical properties of the cathode active material when a compound of the coating element is used. For example, the coating film may be formed using a spray coating method and/or a dipping method. The coating methods may be well understood by one of ordinary skill in the art, and thus a detailed description thereof will be omitted.

In some embodiments, the cathode according to one or more embodiments may be manufactured using the cathode active material according to one or more embodiments as a large-particle-size cathode active material, together with a small-particle-size cathode active material. The cathode according to one or more embodiments may contain such a bimodal cathode active material.

According to another aspect, a lithium battery may include a cathode including a cathode active material according to any of the above-described embodiments, an anode, and an electrolyte disposed between the cathode and the anode. The lithium battery may be manufactured according to the following method.

First, the cathode may be formed according to the above-described method.

Next, the anode may be formed as follows: the anode may be prepared in the same manner as applied to the cathode, except for using an anode active material instead of the cathode active material. A conducting agent, a binder, and a solvent which may be used to prepare an anode active material composition may be the same as those used in the cathode.

For example, an anode active material, a conducting agent, a binder, and a solvent may be mixed together to prepare the anode active material composition. The anode active material composition may be directly coated on a copper current collector to prepare an anode. In some embodiments, the anode active material composition may be cast on a separate support to form an anode active material film. This anode active material film may then be separated from the support and then laminated on a copper current collector to prepare an anode.

The anode active material may be any suitable material that is generally used in the art. For example, the anode active material may include lithium metal, a metal alloyable with lithium, a transition metal oxide, a non-transition metal oxide, a carbonaceous material, or a combination thereof.

For example, the metal alloyable with lithium may be Si, Sn, Al, Ge, Pb, Bi, Sb, an Si—Y' alloy (wherein Y' may be an alkali metal, an alkaline earth metal, a Group 13 to a Group 16 element, a transition metal, a rare earth element, or a combination thereof, but is not Si), or an Sn—Y' alloy (wherein Y' may be an alkali metal, an alkaline earth metal, a Group 13 to a Group 14 element, a transition metal, a rare earth element, or a combination thereof, but is not Sn). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide may include a lithium titanium oxide, a vanadium oxide, a lithium vanadium oxide, or a combination thereof.

Examples of the non-transition metal oxide may include $SnO_2$ and/or $SiO_x$ (wherein $0<x<2$).

The carbonaceous material may be crystalline carbon, amorphous carbon, or a combination thereof. Examples of the crystalline carbon may include graphite, such as natural graphite or artificial graphite in shapeless, plate, flake, spherical, or fibrous form. Examples of the amorphous carbon may include soft carbon (carbon calcined at a low temperature), hard carbon, meso-phase pitch carbide, and calcined cokes.

The amounts of the anode active material, the conducting agent, the binder, and the solvent may be any suitable amounts generally used in the art for lithium secondary batteries.

Next, a separator to be disposed between the cathode and the anode may be prepared. The separator for the lithium battery according to any of the embodiments may be any suitable separator commonly used in lithium batteries. In some embodiments, the separator may have low resistance to migration of ions in an electrolyte and have good electrolyte-retaining ability. Examples of the separator may include glass fiber, polyester, Teflon, polyethylene, polypropylene, PTFE, or a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery.

For example, the separator may be formed in the following manner: a polymer resin, a filler, and a solvent may be mixed together to prepare a separator composition. The separator composition may be directly coated on an electrode and then dried to form the separator. In some embodiments, the separator composition may be cast on a support and then dried to form a separator film. This separator film may be separated from the support and then laminated on an electrode to form the separator.

The polymer resin used for forming the separator may be any suitable material commonly used as a binder for an electrode. Examples of the polymer resin may be a vinylidenefluoride/hexafluoropropylene copolymer, PVDF, polyacrylonitrile, polymethylmethacrylate, or a combination thereof.

Next, an electrolyte may be prepared.

In some embodiments, the electrolyte may be an organic electrolyte. In some embodiments, the electrolyte may be a solid electrolyte. Examples of the electrolyte may include a boron oxide and/or lithium oxynitride. However, embodiments are not limited thereto. Any suitable material available as a solid electrolyte in the art may be used. In some embodiments, the solid electrolyte may be formed on the anode by, for example, sputtering.

In some embodiments, the organic electrolyte may be prepared by dissolving a lithium salt in an organic solvent.

The organic solvent may be any suitable solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a combinations thereof.

In some embodiments, the lithium salt may be any suitable material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each independently be a natural number), LiCl, LiI, or a combination thereof.

Figure 7:
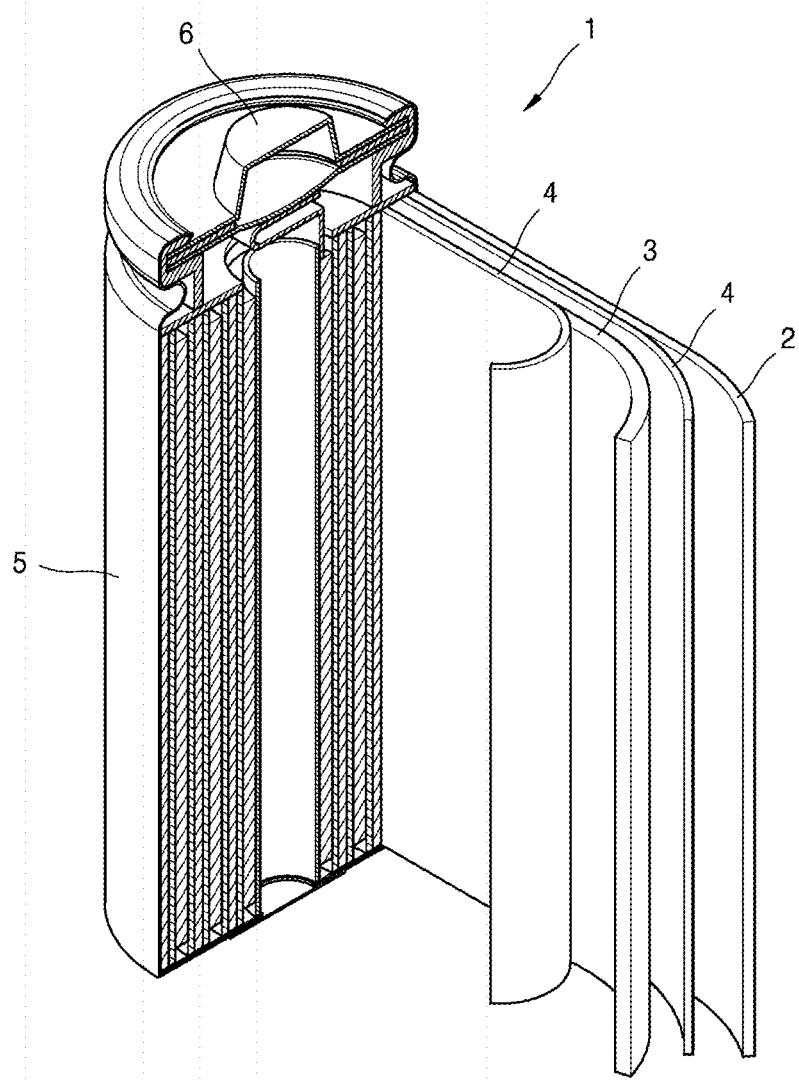
FIG. 7 is a schematic view illustrating a structure of a lithium battery according to an embodiment.

Referring to FIG. 7, a lithium battery 1 according to an embodiment may include a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolyte solution and sealed with a cap assembly 6, thereby completing the manufacture of the lithium battery 1. In some embodiments, the battery case 5 may have a cylindrical, rectangular, or thin-film shape. For example, the lithium battery 1 may be a large, thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with an organic electrolyte. In some embodiments, the resultant assembly may be put into a pouch and hermetically sealed, thereby completing the manufacture of a lithium ion polymer battery.

In some embodiments, a plurality of battery assemblies may be stacked on one another to form a battery pack, which may be used in any device that requires high capacity and high output, for example, in a laptop computer, a smartphone, or an electric vehicle.

The lithium battery may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

One or more embodiments of the present disclosure will now be described in detail with reference to the following examples. However, these examples are only for illustrative purposes and are not intended to limit the scope of the one or more embodiments of the present disclosure.

EXAMPLES

Preparation of Cathode Active Material Precursor

Preparation Example 1

A cathode active material precursor was synthesized using coprecipitation as follows: a shape and size of particles were controlled by adjusting the concentration of a metal precursor solution of melted Ni sulfate, Co sulfate, and manganese sulfate, a ratio of $NH_4OH$ to Me (Ni, Co and Mn), a reaction temperature, a speed of an agitator, a reaction time, and pH through a control of an amount of sodium hydroxide (NaOH).

$NiSO_4(H_2O)_6$, $CoSO_4$, and $MnSO_4 \cdot H_2O$ were put into a 10 liter (L) batch-type reactor in a molar ratio of about 85:10:5, and water was added thereto to prepare an about 0.75M aqueous metal precursor solution. Ammonia water ($NH_4OH$) was added to the aqueous metal precursor solution, and the resulting mixture was reacted at about 40° C. while stirring, followed by dropwise addition of an aqueous solution of sodium hydroxide (NaOH) with a pH adjustor until a pH of the reaction mixture reached about 11. While maintaining the pH of the reaction mixture at this level, the reaction was continued for about 16 hours while stirring the reaction mixture in the reactor at about 300 rpm, to precipitate a nickel-cobalt-manganese ($Ni_{0.85}Co_{0.10}Mn_{0.05}$) hydroxide from the aqueous metal precursor solution. A mixing molar ratio of the ammonia water ($NH_4OH$) to a total metal content in the 0.75M aqueous metal precursor solution was about 1:0.45.

The precipitate obtained through the above-described processes was filtered, washed, and then dried at about 150° C. to prepare nickel-cobalt-manganese hydroxide powder as a cathode active material precursor having a vertical plate network structure. Preparation conditions of the cathode active material precursor according to Preparation Example 1 are shown in Table 1.

Preparation Examples 2 to 5 and Comparative Preparation Examples 1 to 4

Cathode active material precursors were prepared in the same manner as in Preparation Example 1, except for the preparation conditions as represented in Table 1.

TABLE 1

| Example | Composition (Ni/Co/Mn) | Metal precursor solution (M) | Temp. (° C.) | pH | Mixing molar ratio of $NH_4OH$/Total metal content in aqueous metal precursor solution | Stirring rate (rpm) | Reaction time (Hours) |
|---|---|---|---|---|---|---|---|
| Comparative Preparation Example 1 | 85/10/5 | 1.5 | 50 | 11.5 | 0.25 | 500 | 12.0 |
| Comparative Preparation Example 2 | 88/8/4 | 1.5 | 50 | 11.5 | 0.25 | 500 | 18.5 |
| Comparative Preparation Example 3 | 91/6/3 | 1.5 | 50 | 11.5 | 0.25 | 500 | 21.5 |
| Comparative Preparation Example 4 | 85/10/5 | 0.75 | 40 | 11.0 | 0.45 | 300 | 11.5 |
| Preparation Example 1 | 85/10/5 | 0.75 | 40 | 11.0 | 0.45 | 300 | 16.0 |
| Preparation Example 2 | 88/8/4 | 0.75 | 40 | 11.0 | 0.45 | 300 | 24.0 |
| Preparation Example 3 | 88/8/4 | 1.00 | 45 | 11.0 | 0.40 | 500 | 22.5 |
| Preparation Example 4 | 91/6/3 | 0.75 | 40 | 11.0 | 0.45 | 400 | 23.0 |
| Preparation Example 5 | 91/6/3 | 1.00 | 40 | 11.0 | 0.50 | 300 | 26.0 |

Preparation of Cathode Active Material

The cathode active material precursors obtained through the above-described processes were each mixed with $LiOH-H_2O$ to have a ratio of Li to Me (transition metal) of about 1.03 to prepare a source material. The prepared source materials were each thermally treated using a Roller Hearth Kiln (RHK) furnace under an oxygen atmosphere to synthesize cathode active materials. Synthesis conditions were as follows.

Example 1: Preparation of Cathode Active Material

The cathode active material powder obtained according to Preparation Example 1 and $LiOH-H_2O$ were mixed to have a ratio of Li to Me (transition metal) of about 1.03. The resulting mixture was put into the RHK furnace and then first thermally treated at about 750° C. (T1) for about 30 hours while flowing dry air into the furnace. Subsequently, the thermally treated product was washed by water, and then the washed product was dried at a temperature of about 150° C. The dried product was subjected to a secondary thermal treatment at about 720° C. (T2) for about 24 hours in an oxygen (O$_2$) atmosphere as an oxidizing gas.

The preparation conditions of the cathode active material in Example 1 are represented in Table 2.

Examples 2 to 5

Cathode active materials were prepared in the same manner as in Example 1, except for the preparation conditions as represented in Table 2. In Table 2, the term "a heating rate" represents the rate at which the reaction temperature of the furnace is raised for the first heat treatment, the term "maintenance interval temperature" represents the first heat treatment temperature (T1), and the term "maintenance time" represents the time for which the first heat treatment is continued. The term "cooling rate" represents the rate at which the temperature is decreased to adjust the temperature to the second heat treatment temperature from the first heat treatment temperature.

Example 6

A cathode active material was prepared in the same manner as in Example 1, except that the heating rate and maintenance time in Table 2 were varied to about 0.8° C./min and about 9 hours, respectively.

Comparative Examples 1 to 4

Cathode active materials were prepared in the same manner as in Example 1, except for the preparation conditions as represented in Table 2.

TABLE 2

|  | Composition (Ni/Co/Mn) | Heating rate (° C./min) | Maintenance interval temperature (° C.) | Maintenance time (hr) | Cooling rate (° C./min) |
|---|---|---|---|---|---|
| Comparative Example 1 | 85/10/5 | 1° C./min | 750 | 11.5 hr | 1.6° C./min |
| Comparative Example 2 | 88/8/4 |  | 740 |  |  |
| Comparative Example 3 | 91/6/3 |  | 740 |  |  |
| Comparative Example 4 | 85/10/5 |  | 750 |  |  |
| Example 1 | 85/10/5 |  | 750 |  |  |
| Example 2 | 88/8/4 |  | 740 |  |  |
| Example 3 | 88/8/4 |  | 740 |  |  |
| Example 4 | 91/6/3 |  | 740 |  |  |
| Example 5 | 91/6/3 |  | 740 |  |  |

In Table 2, the roller speed of the RHK furnace was about 4 millimeter per minute (mm/min).

Manufacture of Lithium Battery (Half Cell)

Manufacturing Example 1: Manufacture of Lithium Battery (Half Cell)

The cathode active material prepared in Example 1, a carbon conducting material (Denka Black), and polyvinylidene fluoride (PVdF) were mixed at a weight ratio of 92:4:4 to prepare a mixture. This mixture was then mixed with N-methyl-pyrrolidone (NMP) in an agate mortar to prepare a slurry. The slurry was bar-coated on an aluminum current collector having a thickness of 15 μm and dried at room temperature, followed by further drying once more in a vacuum at 120° C., roll-pressing, and then punching, thereby manufacturing a cathode having a thickness of 55 μm.

A coin cell was manufactured using the cathode manufactured as above, lithium metal as a counter electrode, a PTFE separator, and a solution prepared as an electrolyte by dissolving 1.25 M of LiPF$_6$ in a mixture of ethylene carbonate (EC), ethyl methyl carbonate (EMC), and dimethyl carbonate (DMC) in a volume ratio of 3:4:3.

Manufacturing Examples 2 to 6: Manufacture of Lithium Battery

Lithium batteries were manufactured in the same manner as in Manufacturing Example 1, except that the cathode active material prepared in Examples 2 to 6 were used, respectively, instead of the cathode active material of Example 1.

Comparative Manufacturing Examples 1 to 5: Manufacture of Lithium Battery (Half Cell)

Lithium batteries were manufactured in the same manner as in Manufacturing Example 1, except that the cathode active materials prepared in Comparative Examples 1 to 5 were used, respectively, instead of the cathode active material of Example 1.

Evaluation Example 1: Field Emission Scanning Electron Microscopy (FE-SEM)

1) Preparation Examples 1 to 5 and Comparative Preparation Examples 1 to 4

The cathode active material precursors obtained according to Preparation Examples 1 to 5 and Comparative Preparation Examples 1 to 4 were analyzed by field emission scanning electron microscopy (FE-SEM) using a Hitachi-S4300 analyzer.

Figure 3A:
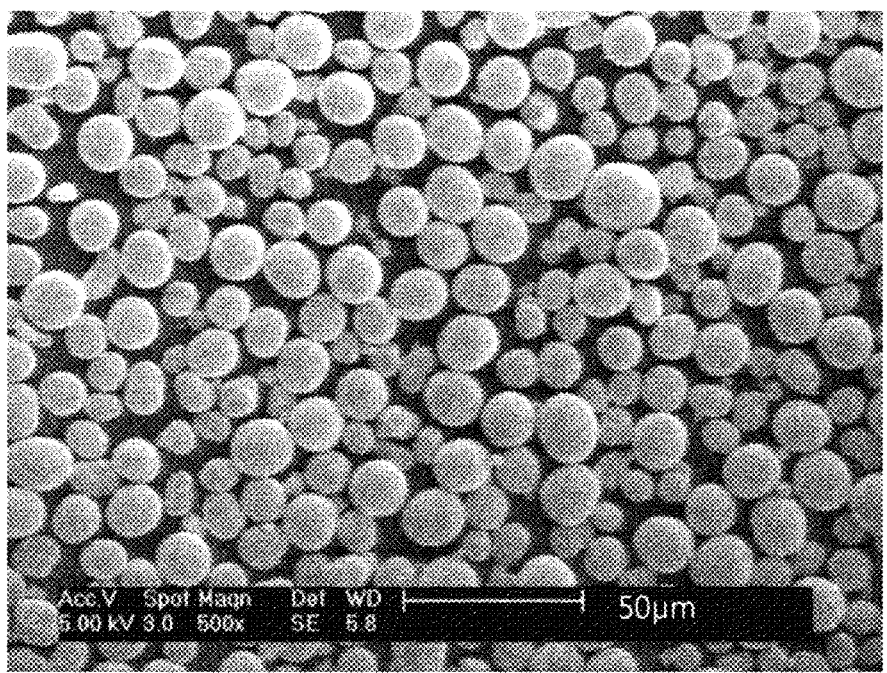
FIGS. 3A to 3J are field emission scanning electron microscope (FE-SEM) images of surfaces of cathode active material precursors prepared in Preparation Examples 1 to 5 according to an embodiment.
Figure 3B:
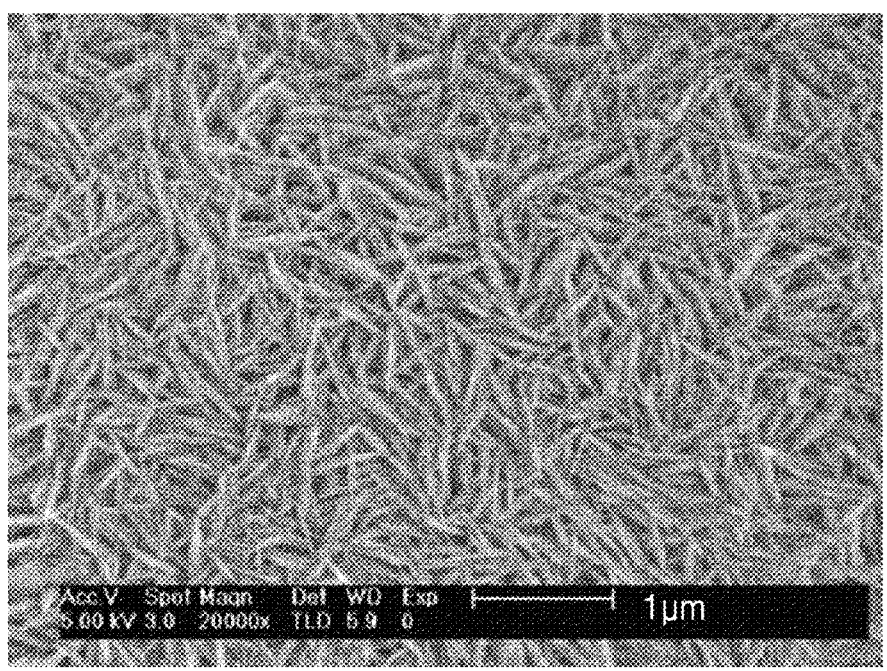
Figure 3C:
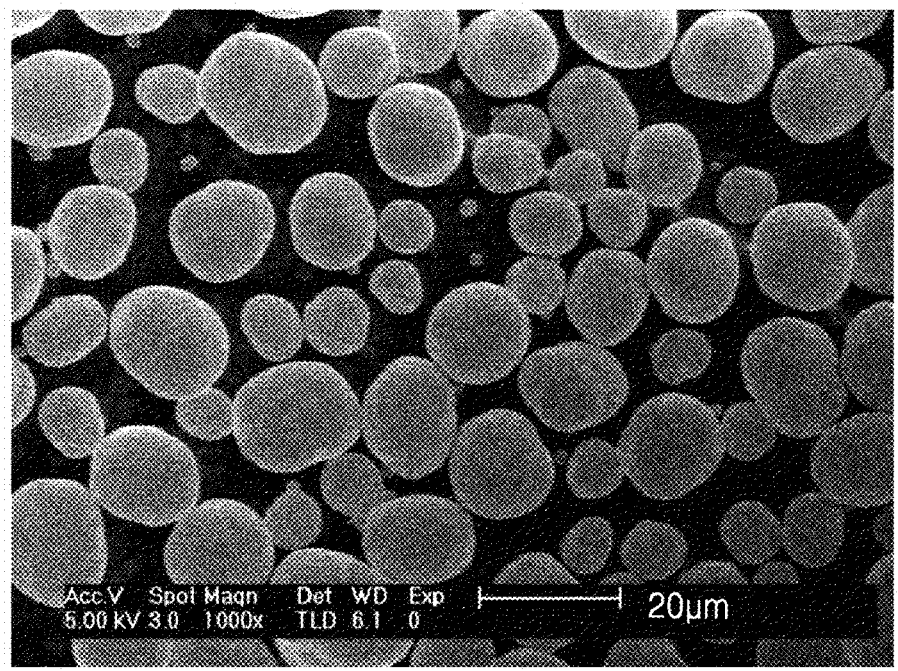
Figure 3D:
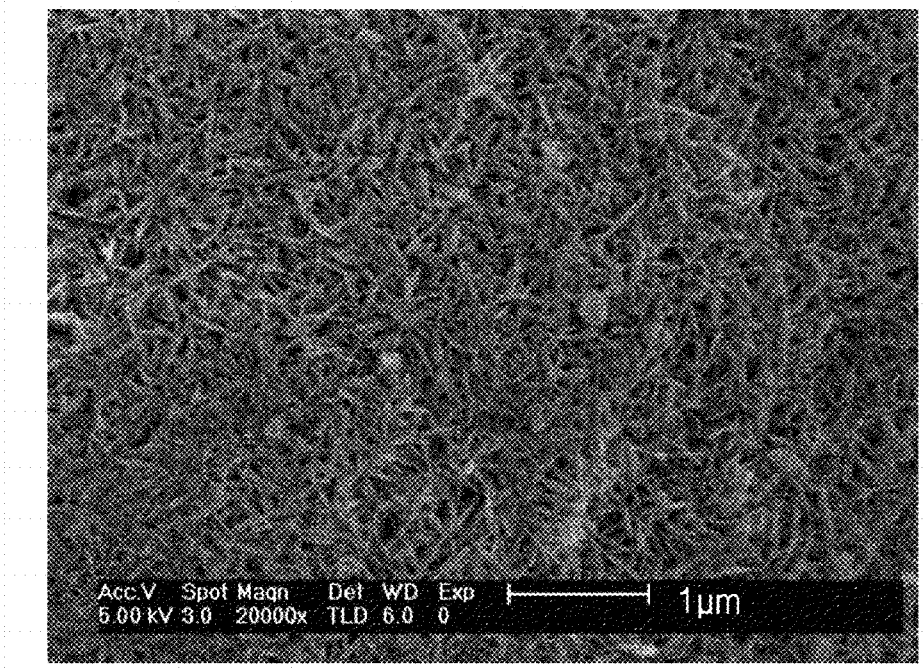
Figure 3E:
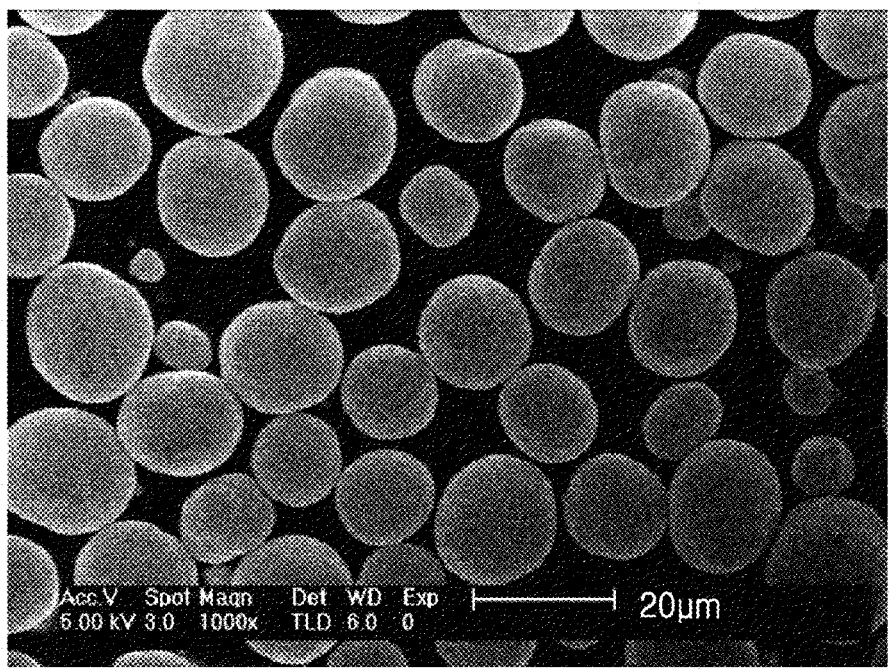
Figure 3F:
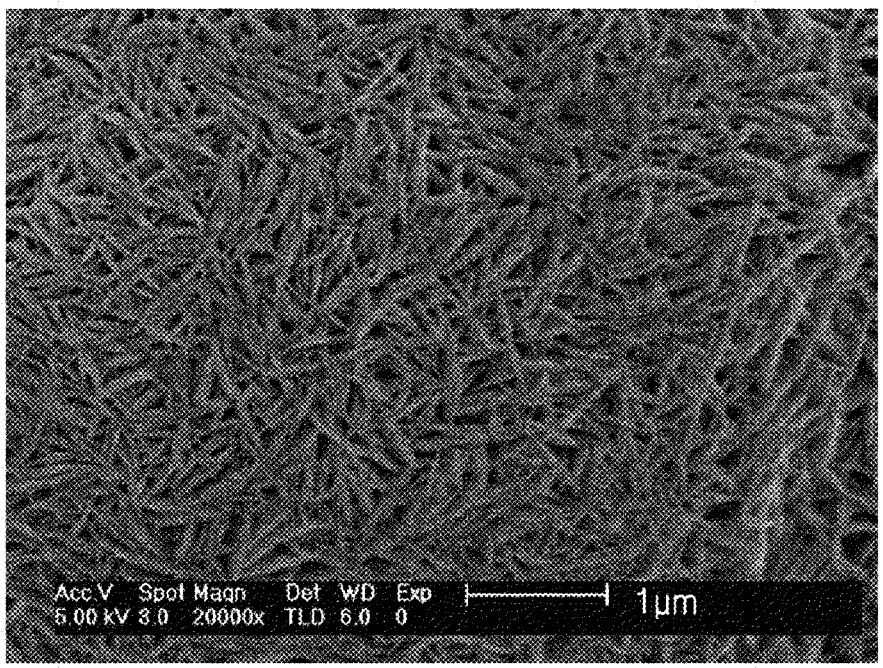
Figure 3G:
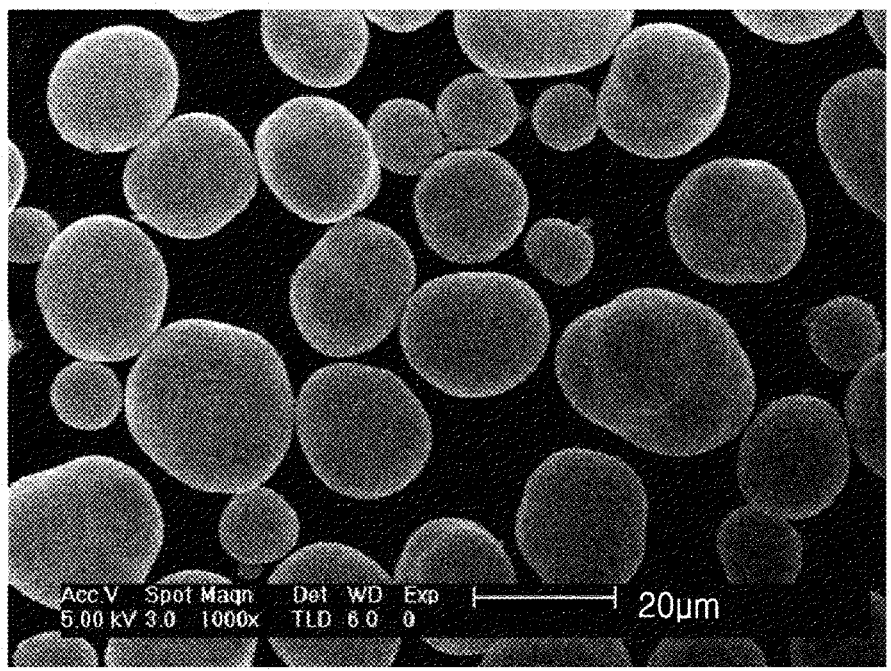
Figure 3H:
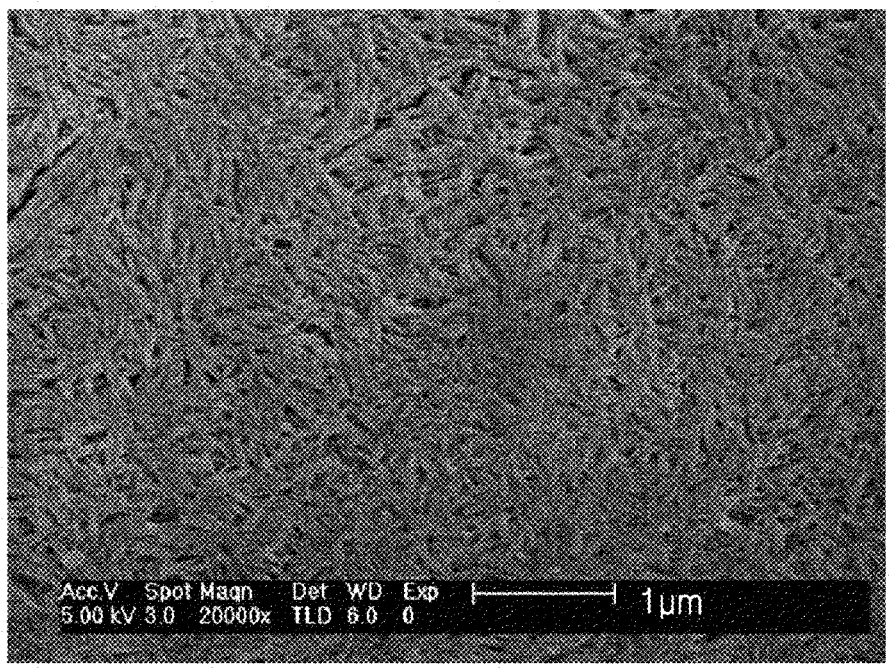
Figure 3I:
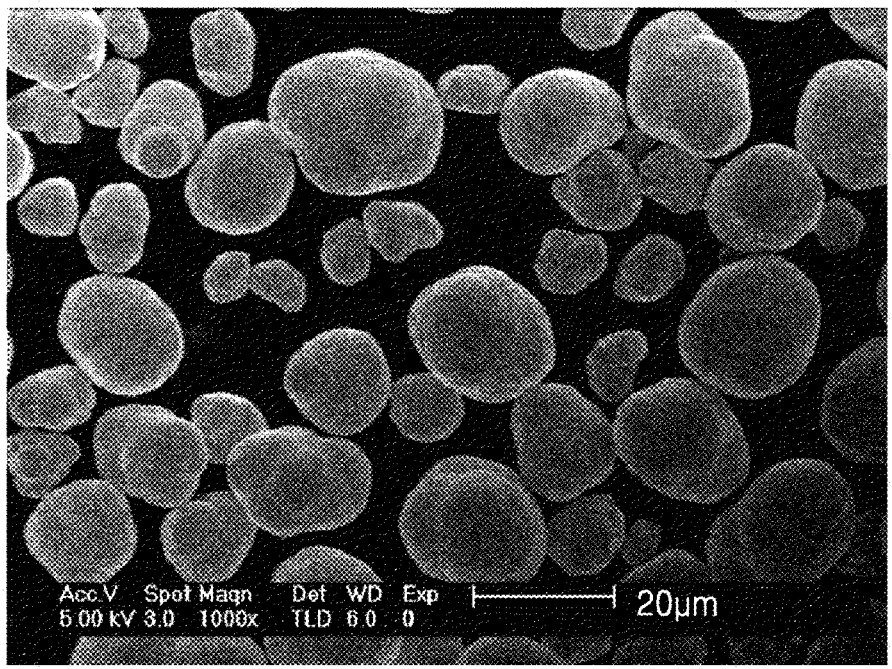
Figure 3J:
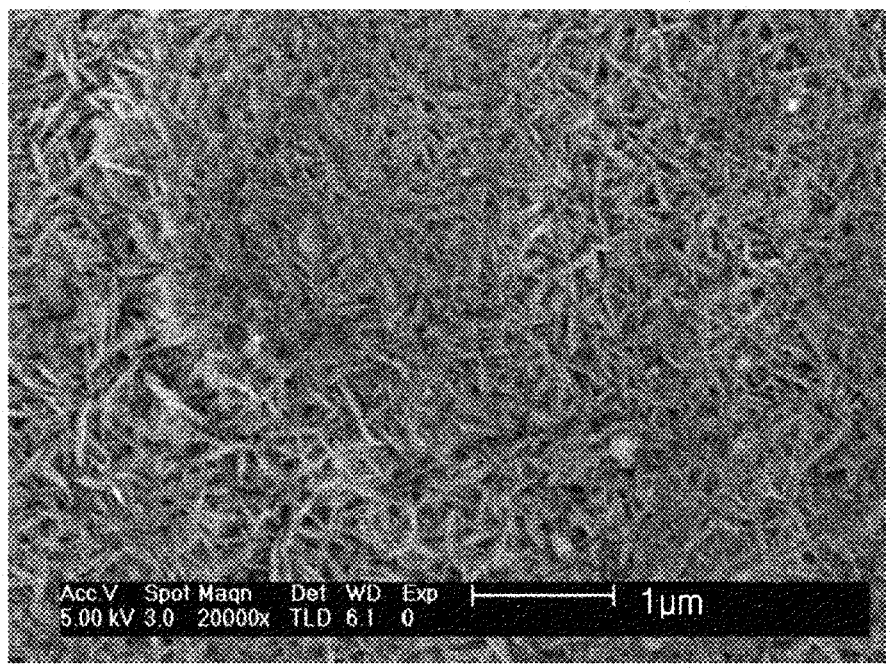
Figure 4A:
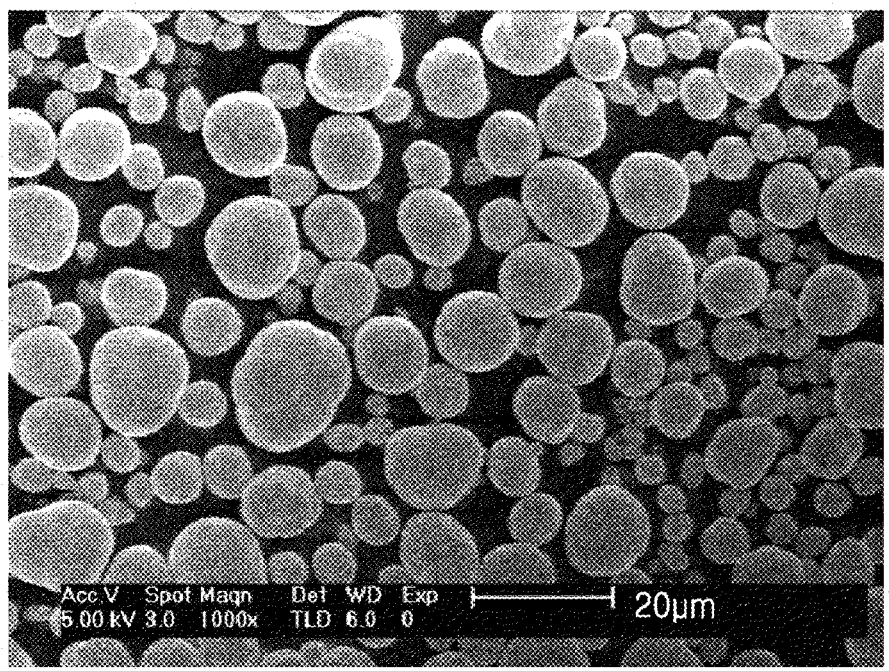
FIGS. 4A to 4H are FE-SEM images of surfaces of cathode active material precursors prepared in Comparative Preparation Examples 1 to 4.
Figure 4B:
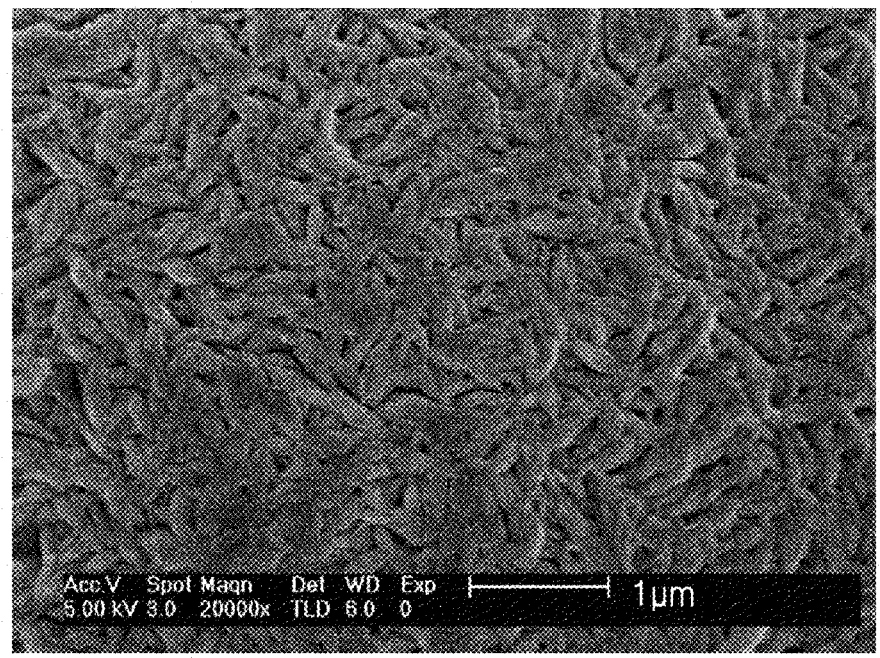
Figure 4C:
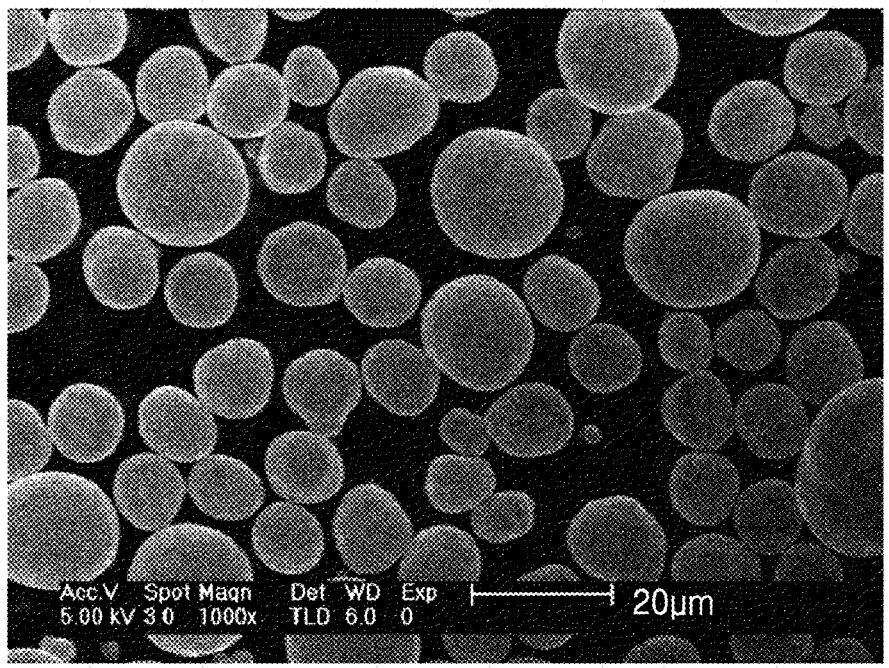
Figure 4D:
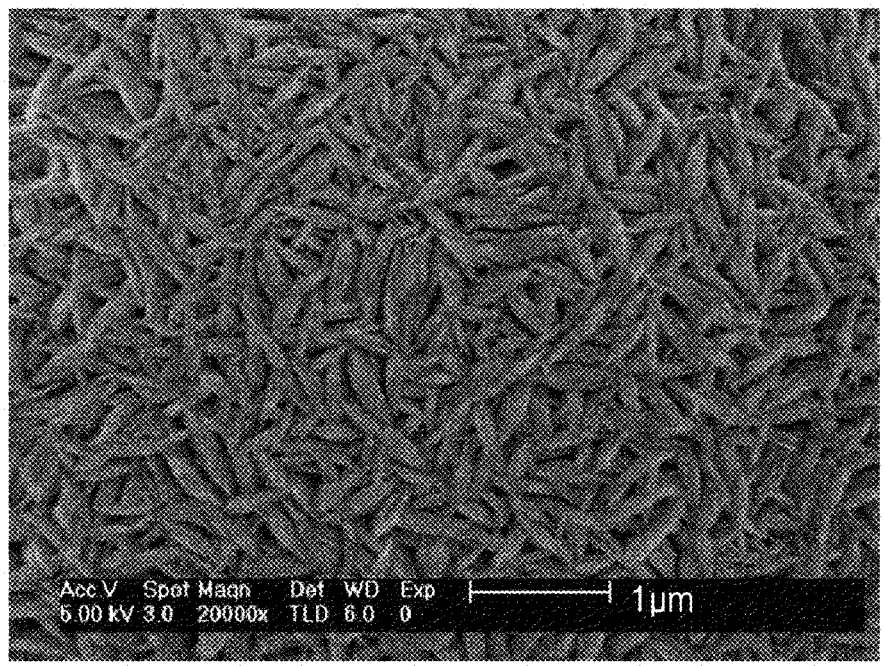
Figure 4E:
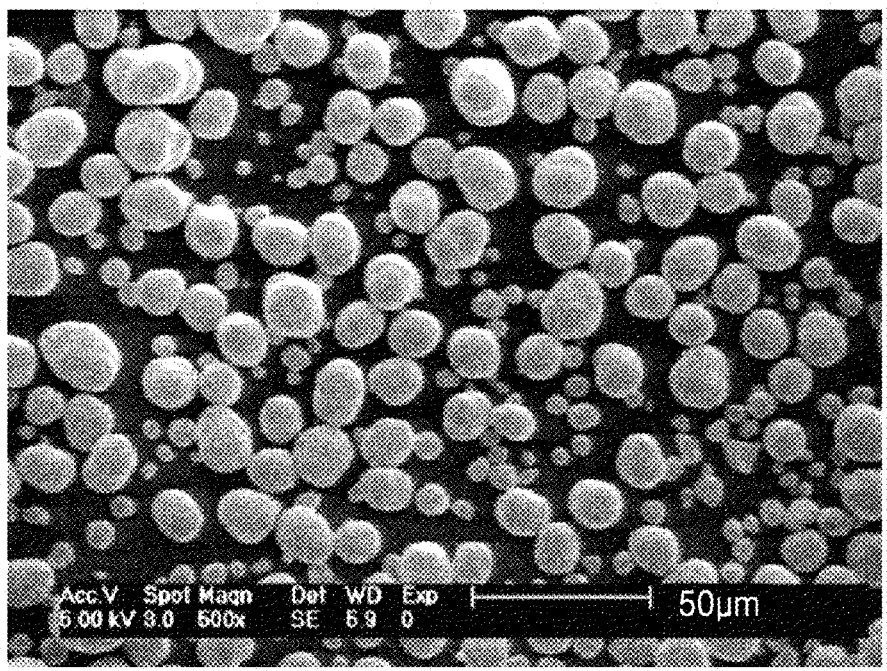
Figure 4F:
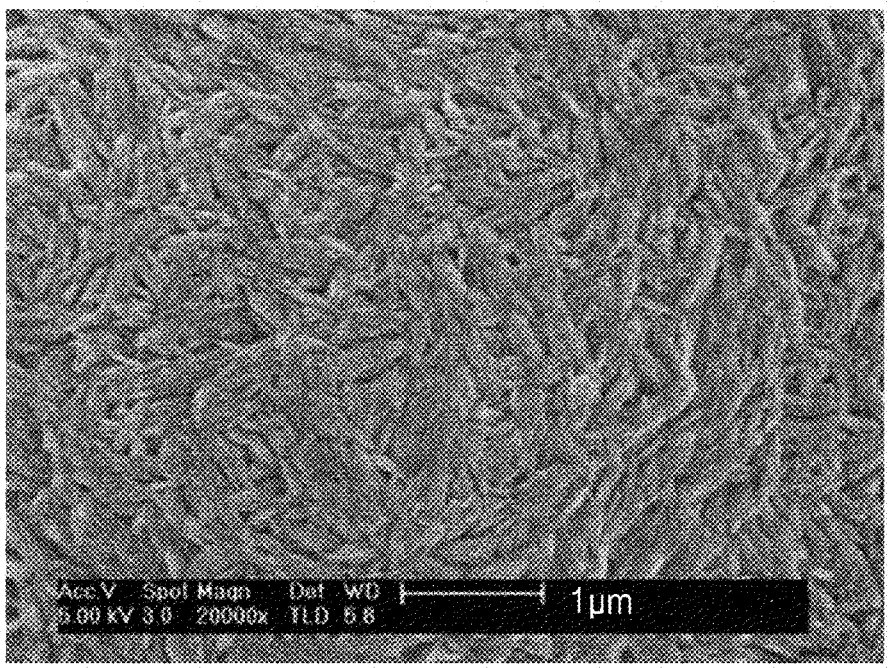
Figure 4G:
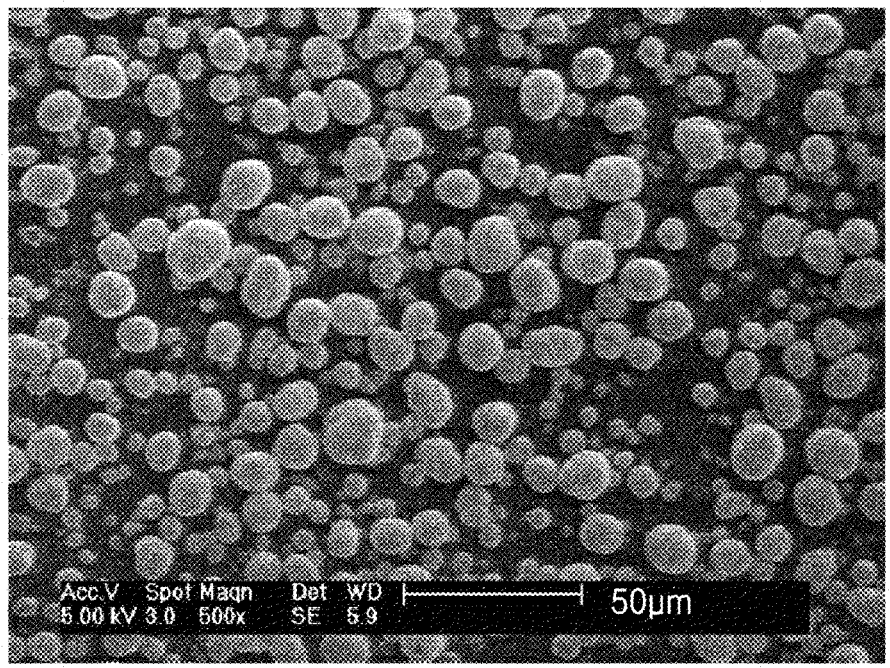
Figure 4H:
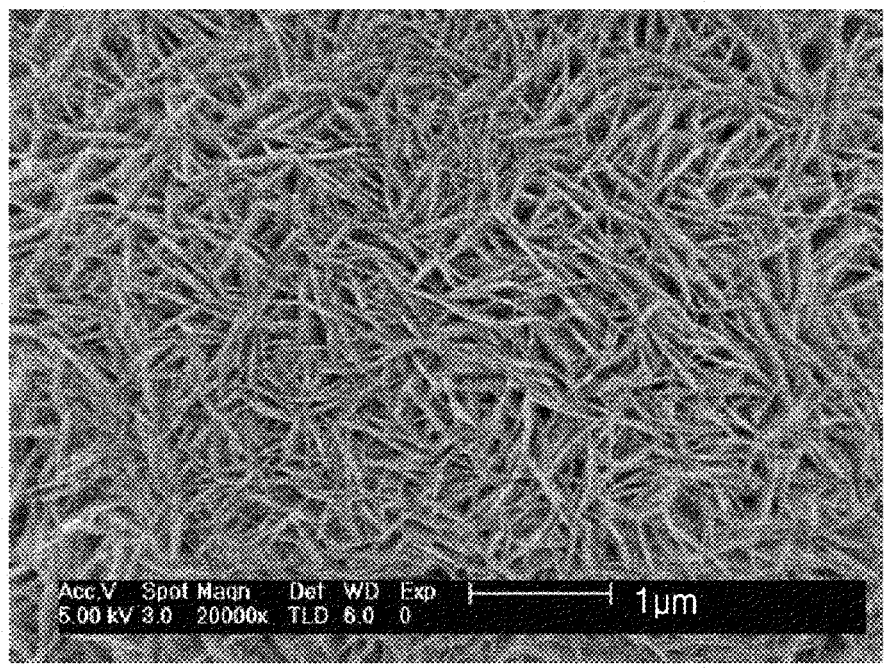
Figure 5A:
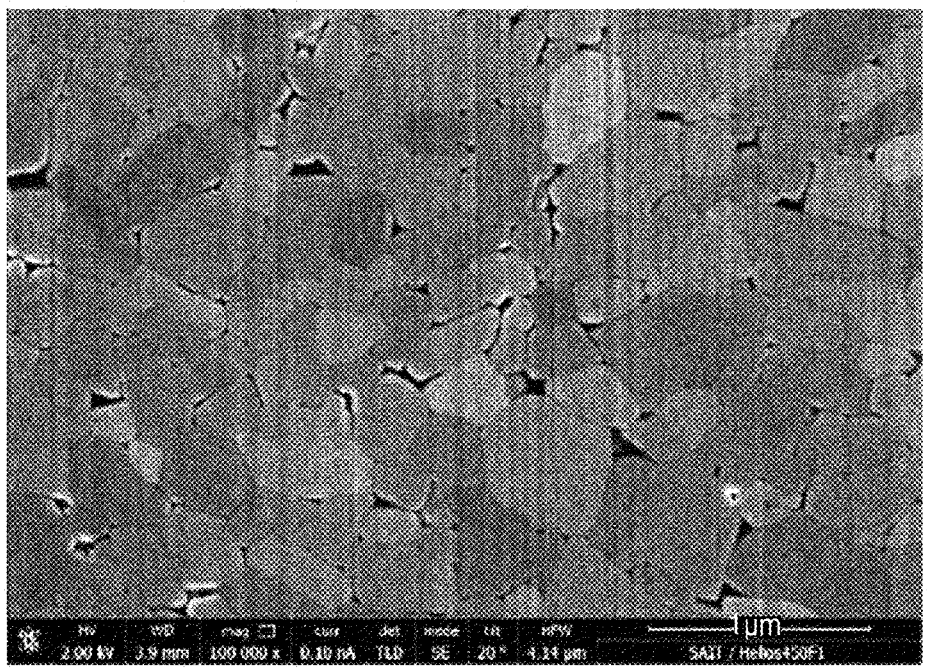
FIGS. 5A to 5E are FE-SEM images of surfaces of cathode active materials of Examples 1 to 5 according to an embodiment, respectively.
Figure 5B:
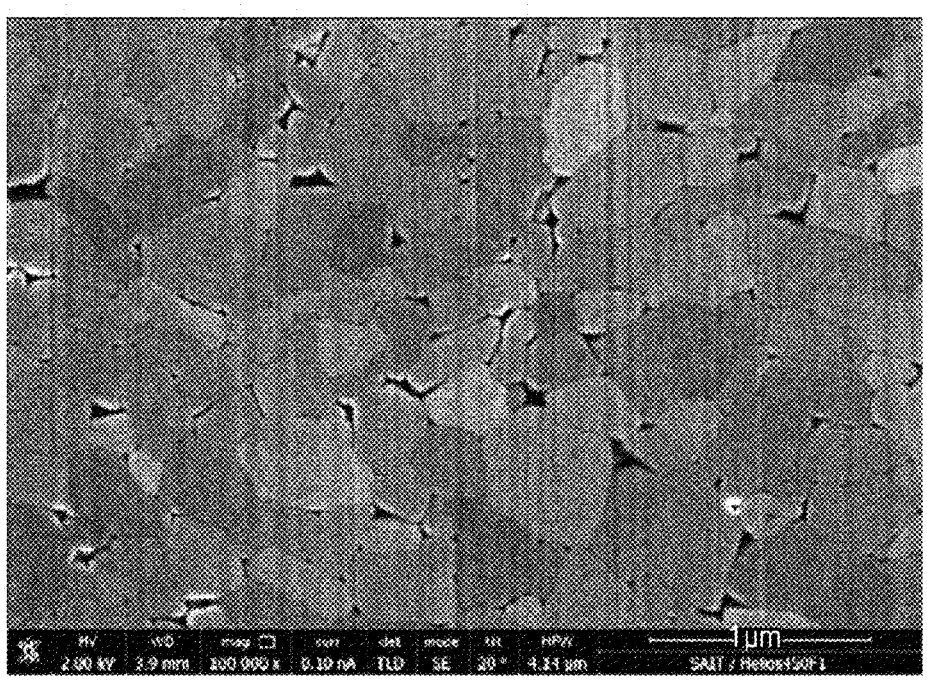
Figure 5C:
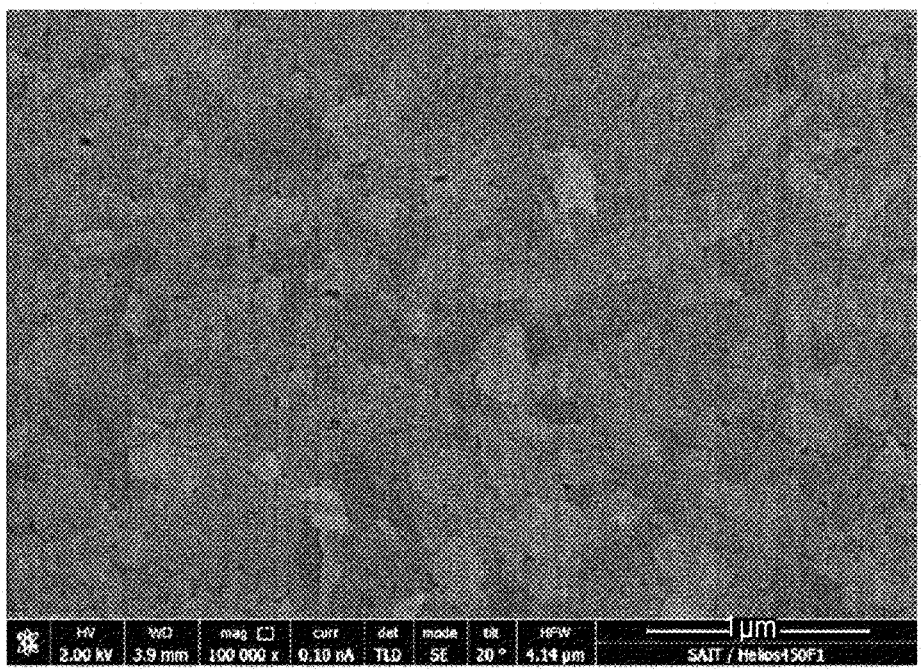
Figure 5D:
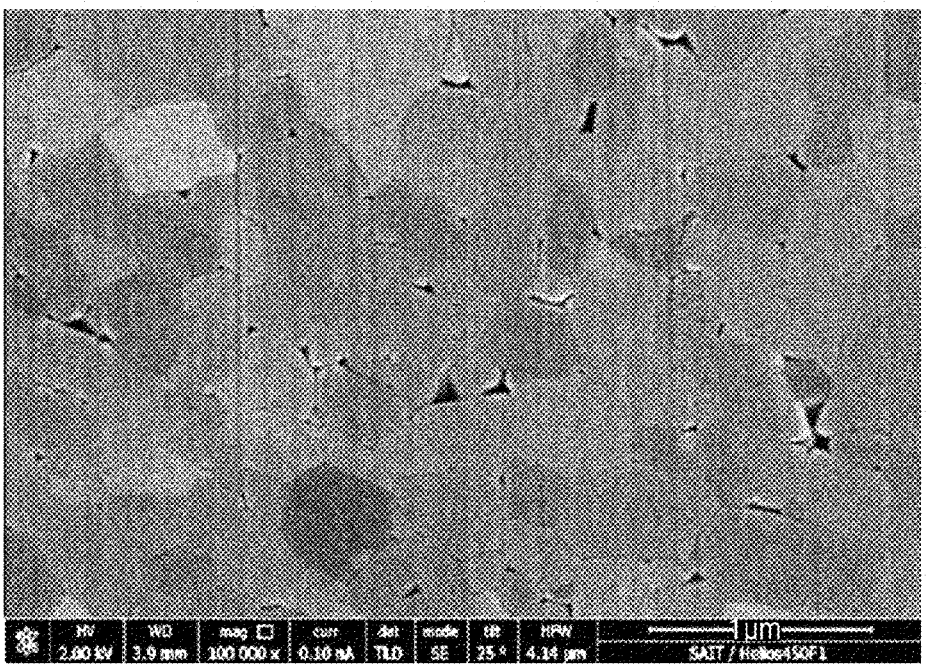
Figure 5E:
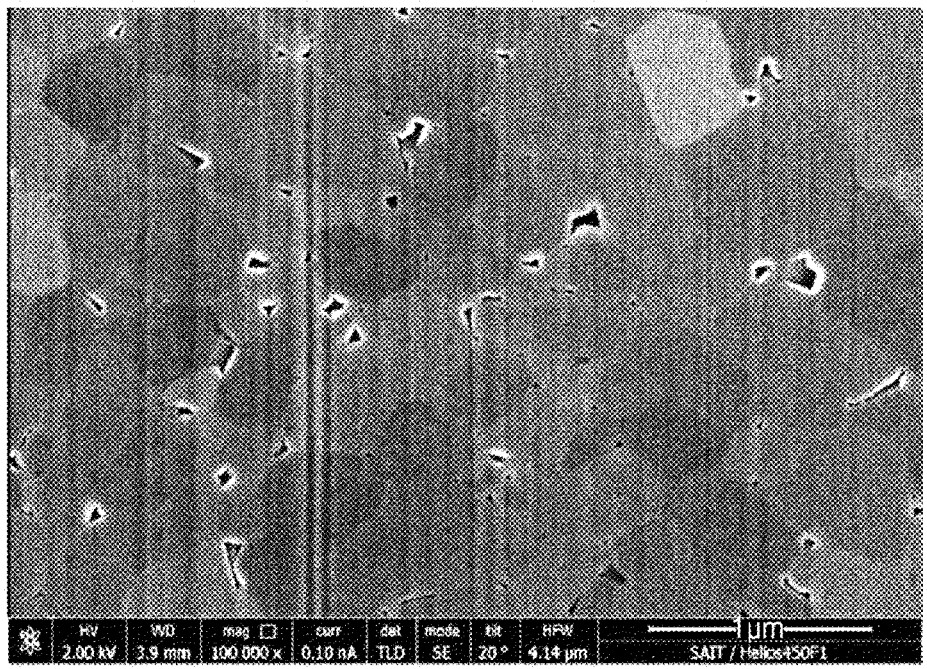
Figure 5F:
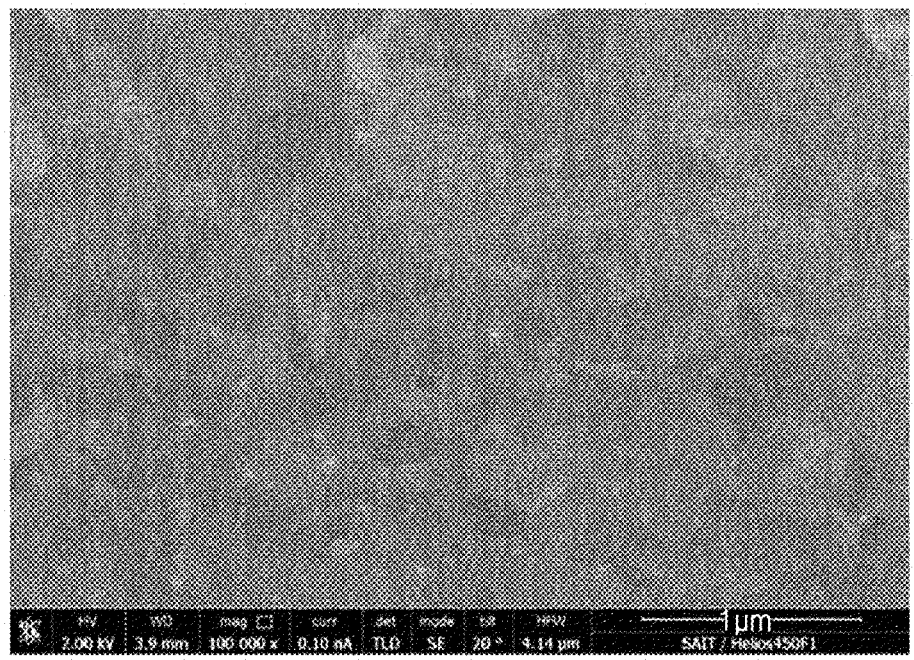
FIGS. 5F to 5I are FE-SEM images of surfaces of cathode active materials of Comparative Examples 1 to 4, respectively.
Figure 5G:
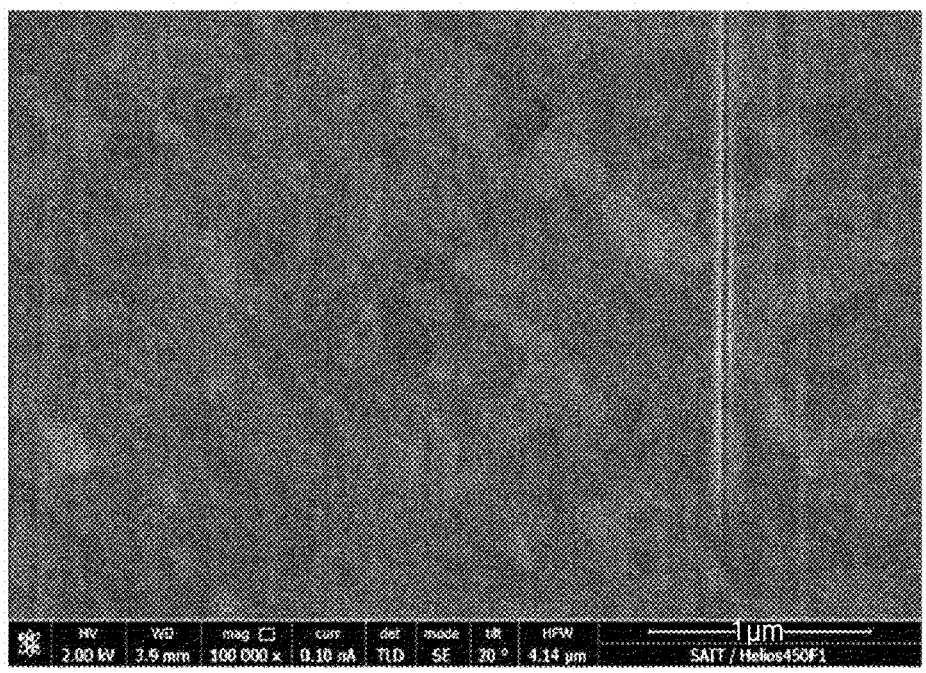
Figure 5H:
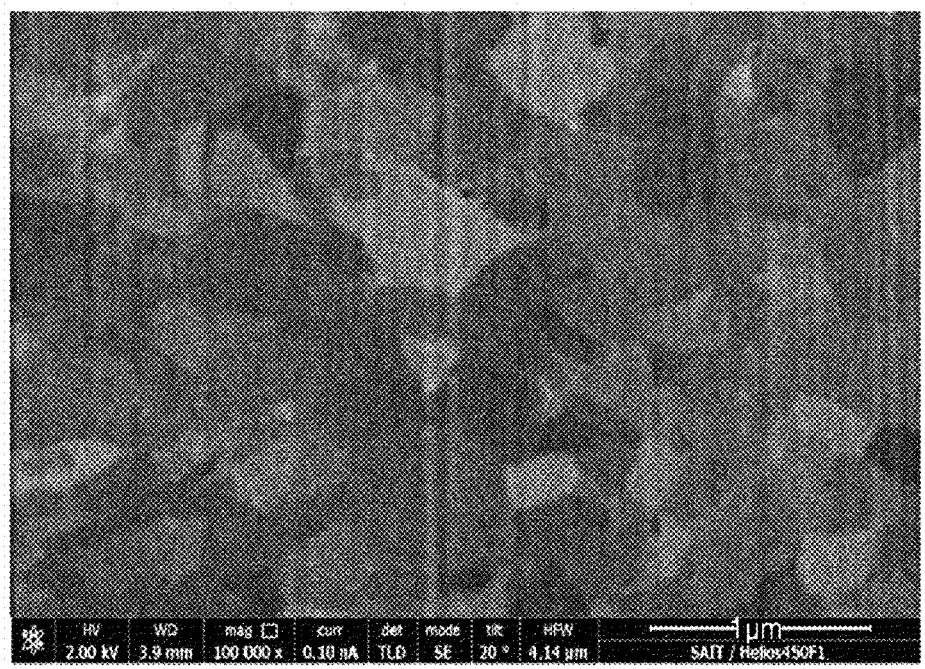
Figure 5I:
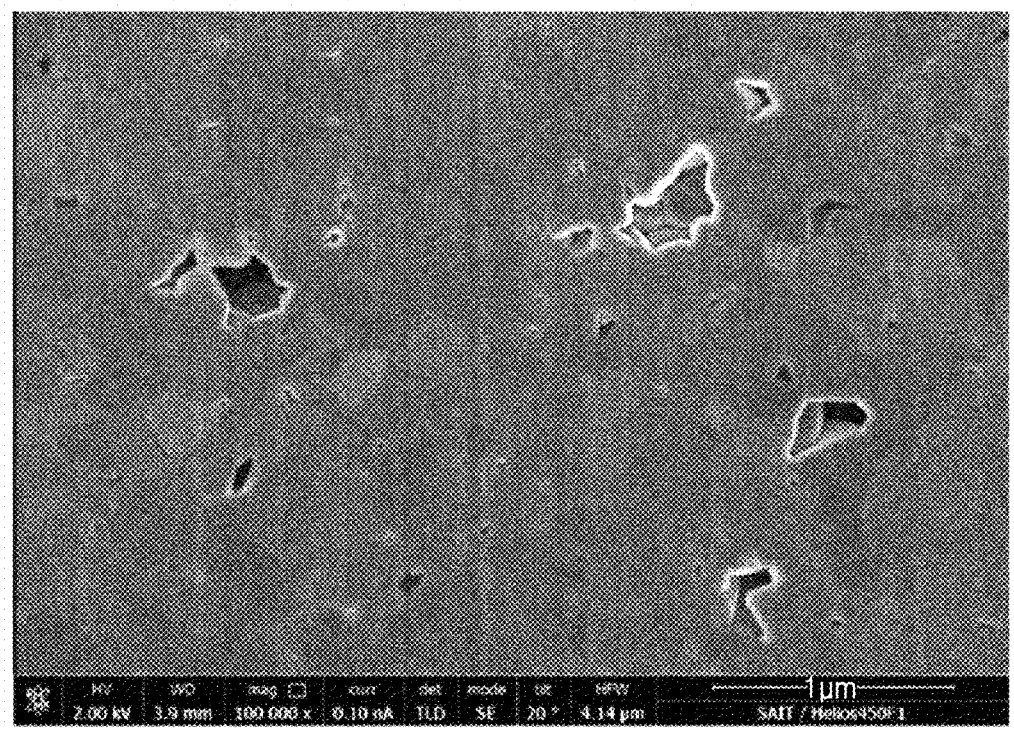

The FE-SEM analysis results of the cathode active material precursor of Preparation Example 1 are shown in FIGS. 3A and 3B. The FE-SEM analysis results of the cathode active material precursor of Preparation Example 2 are shown in FIGS. 3C and 3D. The FE-SEM analysis results of the cathode active material precursor of Preparation Example 3 are shown in FIGS. 3E and 3F. The FE-SEM analysis results of the cathode active material precursor of Preparation Example 4 are shown in FIGS. 3G and 3H. The FE-SEM analysis results of the cathode active material precursor of Preparation Example 5 are shown in FIGS. 3I and 3J.

The FE-SEM analysis results of the cathode active material precursors of Comparative Preparation Examples 1 to 4 are shown in FIGS. 4A to 4H.

Referring to FIGS. 3A to 3I and FIGS. 4A to 4H, the cathode active material precursors of Preparation Examples 1 to 5 were found to have a vertical plate network structure, while the cathode active material precursors of Comparative Preparation Examples 1 to 4 had a less uniform structure. The less uniform structure may have a high density but a low specific area due to the cathode active material precursor being covered with a stripe-like structure. In particular, the stripe-like structure may have a markedly low ratio of the major axis to the minor axis, with respect to plate particles, and a low reactivity due to a low porosity inside the precursor and on a surface thereof.

2) Examples 1 to 5 and Comparative Examples 1 to 4

The cathode active materials prepared in Examples 1 to 5 and Comparative Examples 1 to 4 were analyzed by FE-SEM. The results are shown in FIGS. 5A to 5I.

FIGS. 5A to 5E are FE-SEM images of surfaces of the cathode active material of Example 1 to Example 5, respectively. FIGS. 5F to 5I are FE-SEM images of surfaces of the cathode active material of Comparative Example 1 to Comparative Example 4, respectively.

Referring to FIGS. 5A to 5I, the cathode active materials of Examples 1 to 5 prepared using the precursors having a vertical plate network structure were found to include secondary particles consisting of primary particles that have a uniform size, and in particular, there was considerable porosity among the primary particles, while the cross-sections of the cathode active materials of Comparative Examples 1 to 4 had a wide size distribution of primary particles and a low porosity.

Accordingly, it was found that using the needle-shaped cathode active material precursors of Preparation Examples 1 to 5, having excellent reactivity due to a large specific area, the cathode active materials of Examples 1 to 5 having a uniform, small size of primary particles, as shown in FIGS. 5A to 5E, were obtained. On the contrary, when using the plate-shaped cathode active material precursors of Comparative Preparation Examples 1 to 4, having a smaller specific area, relative to the cathode active material precursors of Preparation Examples 1 to 5 as illustrated in FIGS. 3A to 3J, the cathode active materials of Comparative Examples 1 to 4 were found to include a larger, less uniform size of primary particles, compared to the cathode active materials of Examples 1 to 5, under the same synthesis conditions.

Evaluation Example 2: Measurement of Brunauer-Emmett-Teller (BET) Specific Area, Average Particle Diameter, Major-Axis Length, and Minor-Axis Length of Cathode Active Material Precursor BET specific areas, average particle diameters (D50), major-axis lengths, minor-axis lengths, and morphologies of the cathode active material precursors prepared in Preparation Examples 1 to 5 and Comparative Preparation Examples 1 to 4 were measured. The results are shown in Table 3. The BET specific area was measured using a Mountech Macsorb. In general, prior to a BET specific area measurement, a pre-treatment for removing surface impurities is performed at a low temperature to obtain an accurate measurement value, not causing a change in specific area. To this ends, a pre-treatment of the cathode active material precursors was performed at a low temperature of about 150° C. to prevent undesired changes in the cathode active material precursors.

TABLE 3

| Example | Shape | BET specific area (m$^2$/g) | Average particle diameter (D50) (μm) | Major-axis length (nm) | Minor-axis length (nm) |
| --- | --- | --- | --- | --- | --- |
| Preparation Example 1 | Vertical plate | 17.35 | 13.7 | 150-1500 | 10-45 |
| Preparation Example 2 | network structure | 19.92 | 16.8 | 150-1000 | 10-45 |
| Preparation Example 3 | | 8.52 | 16.7 | 200-500 | 10-130 |
| Preparation Example 4 | | 11.76 | 16.8 | 200-500 | 30-110 |
| Preparation Example 5 | | 15.38 | 19.7 | 150-1000 | 10-45 |
| Comparative Preparation Example 1 | Normal | 5.26 | 13.8 | 250-500 | 50-250 |
| Comparative Preparation Example 2 | | 7.29 | 16.5 | 250-600 | 50-250 |
| Comparative Preparation Example 3 | | 6.34 | 17.2 | 250-500 | 40-250 |
| Comparative Preparation Example 4 | Vertical plate network structure | 18.42 | 9.73 | 150-1500 | 10-45 |

Referring to Table 3, the cathode active material precursors of Preparation Examples 1 to 5 were found to have a BET specific area of greater than or equal to about 8.52 m$^2$/g and an average particle diameter of greater than or equal to about 13.7 μm. In contrast, the cathode active material precursors of Comparative Preparation Examples 1 to 3 had a smaller BET specific area of less than or equal to about 7.29 m$^2$/g, relative to the cathode active material precursors of Preparation Examples 1 to 5. The cathode active material precursor of Comparative Preparation Example 4 had a larger BET specific area, but a far smaller average particle diameter of about 9.73 μm, relative to the cathode active materials of Preparation Examples 1 to 5.

The cathode active material precursors of Preparation Examples 1 to 5 were found to have different morphologies with vertical plate network structures from the morphologies of the cathode active materials of Comparative Preparation Examples 1 to 3.

Evaluation Example 3: Morphologies and Particle Size Distribution Characteristics of Cathode Active Material Based on the FE-SEM analysis results of the cathode active materials in Evaluation Example 1, the cathode active materials of Examples 1 to 5 and Comparative Examples 1 to 4 were analyzed for porosities, areas of first primary particles having a size greater than or equal to about 400 nm, areas of second primary particles having a size less than or equal to about 150 nm, areas of third primary particles having a size of about 150 nm to about 400 nm, and average particle diameters of secondary particles. The results are shown in Table 4.

TABLE 4

| Example | Morphology | Porosity (%) | Area of first primary particles (%) | Area of second primary particles (%) | Area of third primary particles (%) | Average particle diameter of secondary particles (D50)(μm) |
|---|---|---|---|---|---|---|
| Example 1 | Vertical | 2.3 | 7.4 | 0.2 | 92.4 | 15.0 |
| Example 2 | plate | 2.1 | 8.9 | 0.1 | 91.0 | 16.5 |
| Example 3 | network | 1.8 | 2.1 | 8.6 | 89.3 | 16.5 |
| Example 4 | structure | 2.2 | 19.2 | 0.1 | 80.7 | 16.5 |
| Example 5 | | 2.5 | 18.9 | 0.1 | 81.0 | 17.0 |
| Comparative Example 1 | Normal | 0.05 | 18.6 | 1.7 | 79.7 | 16.0 |
| Comparative Example 2 | | 0.05 | 14.5 | 6.4 | 79.1 | 17.0 |
| Comparative Example 3 | | 0.05 | 38.4 | 0.8 | 60.8 | 17.0 |
| Comparative Example 4 | Vertical plate network structure | 10.1 | 9.6 | 0.2 | 90.2 | 16.5 |

Referring to Table 4, the cathode active materials of Examples 1 to 3 were found to have a reduced area of large primary particles (first primary particles) having a size greater than or equal to about 400 nm, compared to the cathode active material of Comparative Example 1. In the cathode active materials of Examples 1 to 5, an area of the third primary particles, an area of the first primary particles, and an area of the second primary particles were greater than or equal to about 80%, less than or equal to about 20%, and less than or equal to about 9%, respectively, of the total area of the primary particles, indicating that the primary particles of the cathode active materials of Examples 1 to 5 had a small size and uniform size distribution.

The cathode active material of comparative Example 4 obtained from the cathode active material precursor having a BET specific area of greater than or equal to about 11 m²/g was found to have a reduced area of the large primary particles (first primary particles) having a size greater than or equal to about 400 nm, compared to the cathode active materials of Comparative Examples 1 to 3. However, the cathode active material of Comparative Example 4 was not practically applicable due to having unsatisfactory pressed density and capacity per volume characteristics as shown in Table 5. Capacity is shown in milliamp hours per gram (mAh/g) and milliamp hours per cubic centimeter (mAh/cc).

Evaluation Example 4: X-Ray Diffraction Analysis

The cathode active material of Example 1 and the cathode active material of Comparative Example 1 were analyzed by In-situ X-ray diffraction (XRD). The analysis results are shown in FIGS. 6A to 6D.

Figure 6A:
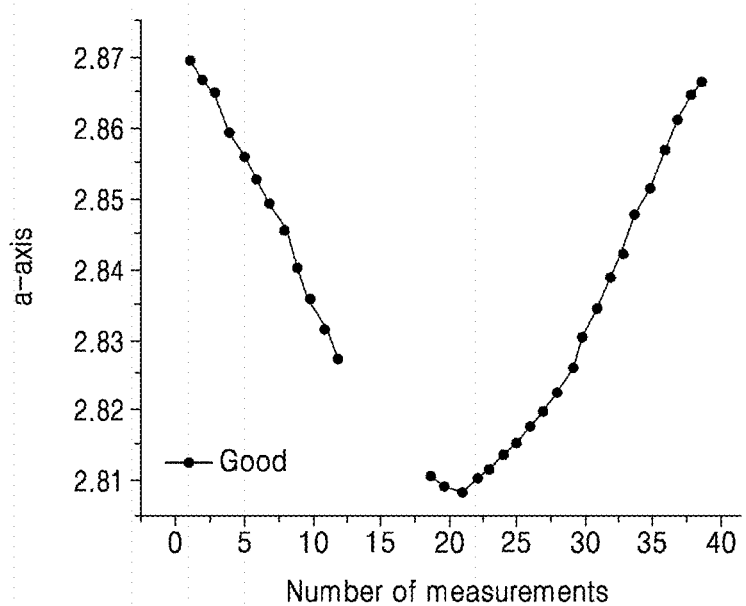
FIGS. 6A and 6B illustrate changes in a-axis and c-axis lattice constants, respectively, as results of X-ray diffraction analysis of the cathode active material of Example 1 used in a lithium battery of Manufacturing Example 1 according to an embodiment.
Figure 6B:
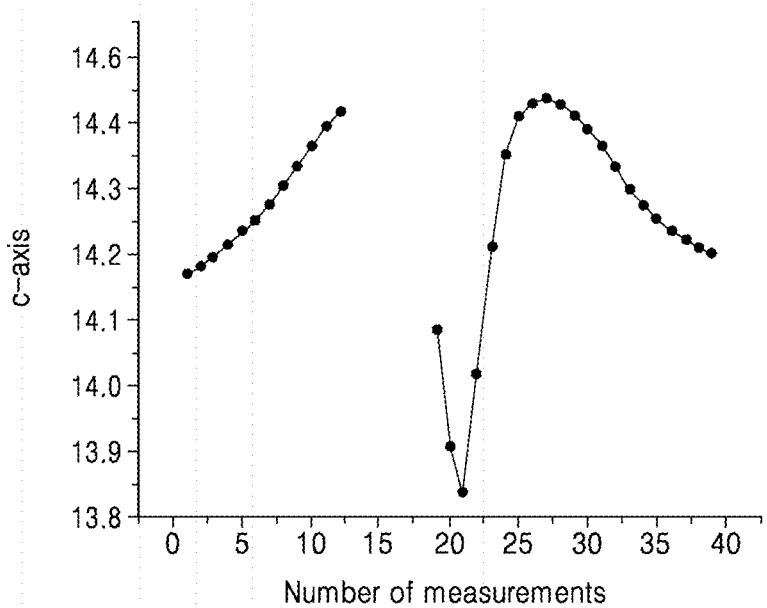
Figure 6C:
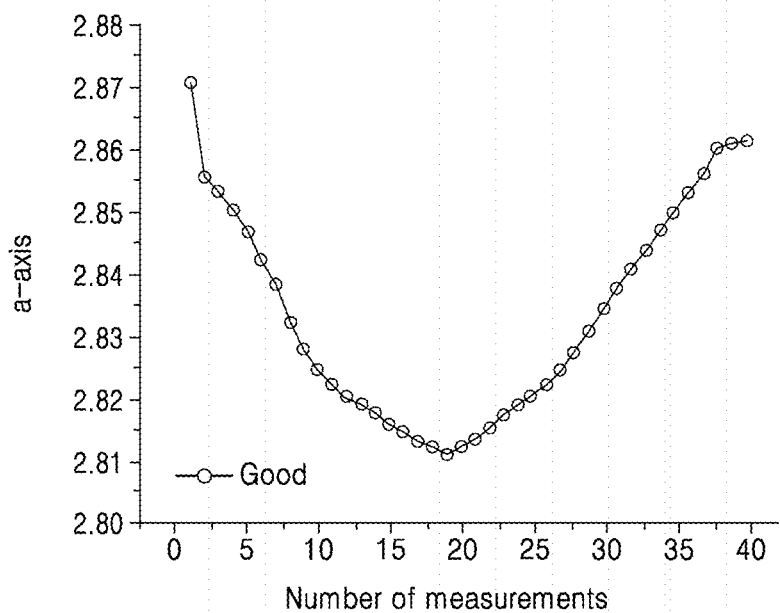
FIGS. 6C and 6D illustrate changes in a-axis and c-axis lattice constants, respectively, as results of X-ray diffraction of the cathode active material of Comparative Example 1 used in a lithium battery of Comparative Manufacturing Example 1.
Figure 6D:
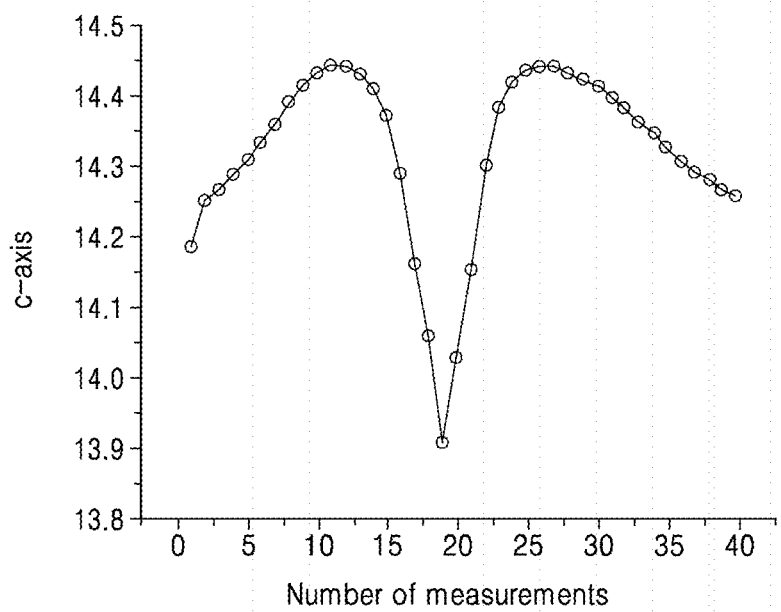

Changes in a-axis and c-axis crystal lattice constants according to the 1st charging and discharging of each lithium battery were analyzed, and the results are shown in FIGS. 6A to 6D. In particular, FIGS. 6A and 6B illustrate changes in a-axis and c-axis lattice constants, respectively, as results of the XRD of the cathode active material of Example 1 used in the lithium battery of Manufacturing Example 1. FIGS. 6C and 6D illustrate changes in a-axis and c-axis lattice constants, respectively, as results of the XRD of the cathode active material of Comparative Example 1 used in the lithium battery of Comparative Manufacturing Example 1. In FIGS. 6A to 6D, the X-axis denotes the number of XRD measurements. In the X-axis, 1 to 21 correspond to measurements after charging, and 22 to 40 correspond to measurements after discharging. In particular, 36 to 40 in the X-axis correspond to measurements when a discharge capacity increase occurred at near 3.5V.

Referring to FIGS. 6A to 6D, a sudden a-axis lattice constant increase and a sudden c-axis lattice constant reduction occurred at near 3.4V at the end of discharging, with relatively greater changes in lattice constant occurring in the sample Example 1 having a high initial efficiency. These results indicate that lattice constant changes during discharging may be greatly influenced by a particle size distribution of primary particles, supporting that a cathode active material including large primary particles, may have reduced discharge efficiency due to poor stress dispersion.

Evaluation Example 5: Charge-Discharge Characteristics

The lithium batteries manufactured in Manufacturing Examples 1 to 5 and Comparative Manufacturing Examples 1 to 4 were charged at about 25° C. with a constant current (C) of 0.1 C rate until a voltage of 4.35V (with respect to Li) was reached, followed by discharging with a constant current of 0.1 C rate until a voltage of 2.8V (with respect to Li) was reached (1$^{st}$ cycle, formation cycle). The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

After the 1$^{st}$ cycle, the lithium batteries were charged at about 25° C. with a constant current of 0.33 C rate until a voltage of 4.35V (with respect to Li) was reached, and then with a constant voltage of 4.35V (constant voltage mode) until a cutoff current of 0.05 C rate was reached, followed by discharging with a constant current of 0.2 C rate until a voltage of 2.8V (with respect to Li) was reached (2$^{nd}$ cycle).

After the 2$^{nd}$ cycle, the lithium batteries were charged at about 25° C. with a constant current of 0.33 C rate until a voltage of 4.35V (with respect to Li) was reached, and then with a constant voltage of 4.35V (constant voltage mode) until a cutoff current of 0.05 C rate was reached, followed by discharging with a constant current of 1 C rate until a voltage of 2.8V (with respect to Li) was reached (3$^{rd}$ cycle).

After the 3$^{rd}$ cycle, charging and discharging each lithium battery were repeated to the 51$^{st}$ cycle (50 cycles of repetition) under the same conditions as the 3$^{rd}$ cycle. A rest time of about 10 minutes was allowed after each charge/discharge cycle throughout the entire charge/discharge cycles.

The results of the charge-discharge test are shown in Table 5, together with pressed densities and capacities per volume of the used cathode active materials.

TABLE 5

| Example | 1st-cycle charge capacity (mAh/g) | Initial efficiency (%) | Pressed density (g/cc) | Capacity per volume (mAh/cc) | Capacity retention (%) |
|---|---|---|---|---|---|
| Manufacturing Example 1 | 236 | 94.9 | 2.70 | 599.4 | 98.2 |
| Manufacturing Example 2 | 242 | 94.2 | 2.97 | 671.2 | 90.4 |
| Manufacturing Example 3 | 244 | 93.9 | 3.02 | 685.5 | 93.5 |
| Manufacturing Example 4 | 247 | 94.7 | 3.04 | 699.2 | 89.2 |
| Manufacturing Example 5 | 246 | 94.7 | 3.08 | 708.4 | 88 |
| Comparative Manufacturing Example 1 | 234 | 85.9 | 2.84 | 553.8 | — |
| Comparative Manufacturing Example 2 | 240 | 88.3 | 2.98 | 625.8 | — |
| Comparative Manufacturing Example 3 | 246 | 88.2 | 3.02 | 652.3 | 88 |
| Comparative Manufacturing Example 4 | 235 | 95.7 | 2.65 | 591.0 | — |

Referring to Table 5, the lithium batteries of Manufacturing Examples 1 to 5 were found to have improved initial efficiencies, relative to the lithium batteries of Comparative Manufacturing Examples 1 to 3.

The lithium battery of Manufacturing Example 1 was found to be improved in initial efficiency and capacity per volume, relative to the lithium battery of Comparative Manufacturing Example 1. The lithium battery of Comparative Manufacturing Example 4 had a similar initial efficiency, but reductions in pressed density of the cathode active material and capacity per volume, compared to those of the lithium battery of Manufacturing Example 1.

The initial efficiency and capacity per volume of the lithium battery of Manufacturing Example 6 were also evaluated using the same methods as used for the lithium battery of Manufacturing Example 1.

As a result, the lithium battery of Manufacturing Example 6 was found to have a similar initial efficiency and capacity per volume to those of the lithium battery of Manufacturing Example 1.

As described above, according to the one or more embodiments, a lithium battery having improved initial efficiency and capacity characteristics may be manufactured using a cathode active material according to any of the above-described embodiments.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A cathode active material comprising:
a secondary particle comprising an aggregate of a plurality of primary particles,
wherein the secondary particle comprises a nickel-containing lithium transition metal oxide having a layered crystal structure,
wherein the plurality of primary particles comprises
a first primary particle having a size greater than about 400 nanometers,
a second primary particle having a size less than about 150 nanometers, and
a third primary particle having a size of about 150 nanometers to about 400 nanometers,
wherein the third primary particle has an area of about 80% to about 95% about 80% of a total area of the plurality of primary particles, and
wherein the secondary particle has a porosity of less than or equal to about 10% of a total area of the cathode active material.
2. The cathode active material of claim 1,
wherein the first primary particle has an area of less than or equal to about 20% of the total area of the plurality of primary particles,
wherein an area of the second primary particle is less than or equal to about 9% of the total area of the plurality of primary particles, and
wherein the secondary particle has a porosity of about 1% to about 10% of the total area of the cathode active material.
3. The cathode active material of claim 1,
wherein the plurality of primary particles has a particle uniformity of greater than or equal to about 90%,
wherein the first primary particle has an area of about 2.1% to about 19.2% of the total area of the plurality of primary particles,
wherein the second primary particle has an area of about 0.1% to about 8.6% of the total area of the plurality of primary particles, and
wherein the secondary particle has a porosity of about 1.5% to about 7% of the total area of the cathode active material.
4. The cathode active material of claim 1, wherein the secondary particle comprising the nickel-containing lithium transition metal oxide having a layered crystal structure has an average particle diameter of about 15 μm to about 30 μm.
5. The cathode active material of claim 1, wherein the nickel-containing lithium transition metal oxide having a layered crystal structure has a layered rock-salt structure and belongs to space group R-3m.
6. The cathode active material of claim 1, wherein the nickel-containing lithium transition metal oxide having a layered crystal structure is a compound represented by Formulae 1 to 4:

$$Li_xNi_{1-y-z-\alpha}Co_yMn_zMe_\alpha O_2 \quad \text{Formula 1}$$

wherein, in Formula 1,
1≤x≤1.1, 0≤y≤0.2, 0≤z≤0.2, 0≤α≤0.05,
Me may be Zr, Al, Mg, Ti, Cu, W, B, or a combination thereof, and
y+z+α≤0.3, $$Li_xCo_{1-y}M_yO_{2-\alpha}X_\alpha \quad \text{Formula 2}$$

$$Li_xNi_{1-y}Me_yO_{2-\alpha}X_\alpha \quad \text{Formula 3}$$

$$Li_xNi_{1-y-z}Mn_yMa_zO_{2-\alpha}X_\alpha \quad \text{Formula 4}$$

wherein, in Formulae 2 to 4,
1≤x≤1.1, 0≤y≤0.9, 0≤z≤0.2, 0≤α≤2,
M may be Ni, Mn, Zr, Al, Mg, Ag, Mo, Ti, V, Cr, Fe, Cu, B, or a combination thereof,
Me may be Co, Zr, Al, Mg, Ag, Mo, Ti, V, Cr, Mn, Fe, Cu, B, or a combination thereof,
Ma may be Co, Zr, Al, Mg, Ag, Mo, Ti, V, Cr, Fe, Cu, B, or a combination thereof, and
X may be F, S, P or a combination thereof, and
wherein x, y, z, α, and Me are independently selected for each of Formulae 1 to 4.

7. The cathode active material of claim 1, wherein the nickel-containing lithium transition metal oxide having a layered crystal structure is a compound represented by Formulae 5 to 7:

$$Li[Li_{1-a}Me_a]O_{2+d} \qquad \text{Formula 5}$$

wherein, in Formula 5, 0.8≤a<1, 0≤d≤0.1, and
Me may be Ni, Co, Mn, Al, V, Cr, Fe, Zr, Re, B, Ge, Ru, Sn, Ti, Nb, Mo, Pt or a combination thereof,

$$Li[Li_{1-x-y-z}Ma_xMb_yMc_z]O_{2+d} \qquad \text{Formula 6}$$

wherein, in Formula 6, 0.8≤x+y+z<1, 0<x<1, 0<y<1, 0<z<1, 0≤d≤0.1, and
Ma, Mb, and Mc are each independently Mn, Co, Ni, Al, or a combination thereof

$$Li[Li_{1-x-y-z}Ni_xCo_yMn_z]O_{2+d} \qquad \text{Formula 7}$$

wherein, in Formula 7, 0.8≤x+y+z<1; 0<x<1, 0<y<1, 0<z<1, and 0≤d≤0.1, and
wherein x, y, z, d, Me, and Ma are independently selected for each of Formulae 5 to 7.

8. The cathode active material of claim 1, wherein the nickel-containing lithium transition metal oxide having a layered crystal structure is a compound represented by Formula 8:

$$aLi_2MnO_3\text{-}(1-a)LiMO_2 \qquad \text{Formula 8}$$

wherein, in Formula 8, 0<a<1, and
M comprises nickel, cobalt, manganese, vanadium, chromium, iron, zirconium, rhenium, aluminum, boron, germanium, ruthenium, tin, titanium, niobium, molybdenum, platinum, or a combination thereof.

9. The cathode active material of claim 1, wherein the nickel-containing lithium transition metal oxide having a layered crystal structure is a compound represented by Formula 9:

$$Li_xNi_{1-y-z}M_yCo_zO_2 \qquad \text{Formula 9}$$

wherein, in Formula 9, 0.90≤x≤1.1, 0≤y≤0.2, 0<z≤0.2, 0.7≤1-y-z≤0.99, and
M is manganese, aluminum, titanium, calcium, or a combination thereof.

10. The cathode active material of claim 1, wherein the nickel-containing lithium transition metal oxide having a layered crystal structure is a compound represented by Formula 9a:

$$Li_xNi_{1-y-z}M_xCo_yO_2 \qquad \text{Formula 9a}$$

wherein, in Formula 9a, 0.80≤x≤1.1, 0≤y≤0.2, 0<z≤0.2, and 0.8≤1-y-z≤0.99.

11. The cathode active material of claim 10, wherein the nickel-containing lithium transition metal oxide having a layered crystal structure is  $Li_{1.03}[Ni_{0.91}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.05}$  $[Ni_{0.88}Co_{0.08}Mn_{0.04}]O_2$, $Li_{1.05}[Ni_{0.8}Co_{0.15}Mn_{0.05}]O_2$, $Li_{1.05}[Ni_{0.85}Co_{0.10}Mn_{0.05}]O_2$, $Li_{1.05}[Ni_{0.91}Co_{0.05}Mn_{0.04}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.15}Mn_{0.05}]O_2$, $Li_{1.06}[Ni_{0.85}Co_{0.10}Mn_{0.05}]O_2$, $Li_{1.06}[Ni_{0.91}Co_{0.05}Mn_{0.04}]O_2$; $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, or $Li_{1.09}[Ni_{0.91}Co_{0.05}Mn_{0.04}]O_2$.

12. The cathode active material of claim 1, wherein the cathode active material further includes a small-particle-size cathode active material, and a mixture of the cathode active material and small-particle-size cathode active material has a pressed density of about 3.3 grams per cubic centimeter or greater.

13. A cathode comprising the cathode active material of claim 1.

14. A lithium battery comprising:
the cathode of claim 13,
an anode,
and an electrolyte disposed between the cathode and the anode.

15. The lithium battery of claim 14, wherein the lithium battery has an initial efficiency of about 93% or greater, and the cathode has a pressed density of greater than or equal to about 2.8 grams per cubic centimeter.

16. The lithium battery of claim 14, wherein, after discharging to 3.5 volts, the cathode active material has
an a-axis crystal lattice constant that is about 0.1% to about 0.5% less than an a-axis crystal lattice constant before the discharging, and
a c-axis crystal lattice constant that is about 0.1% to about 0.5% greater than a c-axis crystal lattice constant before the discharging.

17. A method of preparing a cathode active material, the method comprising:
mixing the cathode active material precursor and a lithium precursor to produce a mixture, wherein the cathode active material precursor has a specific area of about 8 square meters per gram to about 25 square meters per gram, and an average particle diameter of about 13.7 micrometers or greater, and wherein the cathode active material precursor is a vertical plate network-structured precursor of a nickel-containing lithium transition metal oxide;
first thermally treating the mixture to produce a first product;
washing the first product with water to produce a washed product;
drying the washed product to produce a dried product; and
second thermally treating the dried product to prepare the cathode active material of claim 1,
wherein a temperature of the second thermal treatment is less than a temperature of the first thermal treatment, and the cathode active material precursor includes a vertical plate network-structured precursor of a nickel-containing lithium transition metal oxide, wherein the cathode active material precursor has a specific area of about 8 square meters per gram to about 25 square meters per gram, and an average particle diameter of about 13.7 micrometers or greater.

18. The method of claim 17, wherein the cathode active material precursor is prepared by:
mixing a metal source, a complexing agent, and a pH-adjusting agent to produce a mixture;
adjusting a pH of the mixture to produce a pH-adjusted mixture; and
reacting the pH-adjusted mixture.

* * * * *